(12) United States Patent
Furusato et al.

(10) Patent No.: US 8,968,597 B2
(45) Date of Patent: Mar. 3, 2015

(54) LIQUID CRYSTAL COMPOSITION AND LIQUID CRYSTAL DISPLAY DEVICE

(71) Applicants: JNC Corporation, Tokyo (JP); JNC Petrochemical Corporation, Tokyo (JP)

(72) Inventors: Yoshimasa Furusato, Chiba (JP); Subaru Kawasaki, Chiba (JP); Eriko Kurihara, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/959,757

(22) Filed: Aug. 6, 2013

(65) Prior Publication Data
US 2014/0043579 A1 Feb. 13, 2014

(30) Foreign Application Priority Data
Aug. 8, 2012 (JP) .................. 2012-175998

(51) Int. Cl.
| | |
|---|---|
| C09K 19/52 | (2006.01) |
| C09K 19/06 | (2006.01) |
| G02F 1/1333 | (2006.01) |
| C09K 19/34 | (2006.01) |
| C09K 19/30 | (2006.01) |
| C09K 19/32 | (2006.01) |
| C09K 19/00 | (2006.01) |
| C09K 19/02 | (2006.01) |
| C09K 19/56 | (2006.01) |
| G02F 1/139 | (2006.01) |
| C09K 19/12 | (2006.01) |
| C09K 19/14 | (2006.01) |
| C09K 19/04 | (2006.01) |

(52) U.S. Cl.
CPC .............. *C09K 19/56* (2013.01); *G02F 1/1396* (2013.01); *C09K 19/12* (2013.01); *C09K 19/14* (2013.01); *C09K 2019/0448* (2013.01); *C09K 2019/122* (2013.01); *C09K 2019/123* (2013.01)
USPC .............. 252/299.6; 252/299.61; 252/299.62; 252/299.63; 252/299.66; 349/86; 349/182; 349/183; 428/1.1

(58) Field of Classification Search
USPC ............ 349/86, 182, 183; 252/299.01, 299.6, 252/299.61–299.63; 428/1.1
See application file for complete search history.

(56) References Cited

U.S. PATENT DOCUMENTS

2013/0277609 A1* 10/2013 Goto et al. ............... 252/299.61

FOREIGN PATENT DOCUMENTS

| | | |
|---|---|---|
| JP | 11-130729 | 5/1999 |
| JP | 2004-131704 | 4/2004 |
| JP | 2006-137856 | 6/2006 |
| JP | 2008-274235 | 11/2008 |
| JP | 2009-102639 | 5/2009 |
| JP | 2010-189282 | 9/2010 |
| JP | 2010-536894 | 12/2010 |
| JP | 2010-537010 | 12/2010 |
| WO | 2010-084823 | 7/2010 |

OTHER PUBLICATIONS

"International Search Report (Form PCT/ISA/210)", mailed on Sep. 24, 2013, with English translation thereof, p.1-p. 4.

* cited by examiner

*Primary Examiner* — Geraldina Visconti
(74) *Attorney, Agent, or Firm* — Jianq Chyun IP Office

(57) ABSTRACT

A liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat or that is suitably balanced between at least two of the characteristics, is described. The liquid crystal composition includes a compound having three or more polymerizable groups as a first component and a compound having one or two polymerizable groups as a second component in a suitable ratio, and that may include a specific compound having a large negative dielectric anisotropy and a low minimum temperature as a third component or a specific compound having a small viscosity or a high maximum temperature as a fourth component.

22 Claims, No Drawings

LIQUID CRYSTAL COMPOSITION AND LIQUID CRYSTAL DISPLAY DEVICE

CROSS-REFERENCE TO RELATED APPLICATIONS

This application claims the priority benefit of Japan Application serial No. 2012-175998, filed on Aug. 8, 2012. The entirety of the above-mentioned patent application is hereby incorporated by reference herein and made a part of this specification.

TECHNICAL FIELD

The invention relates to a liquid crystal composition including a polymerizable compound that is polymerized by light or heat for instance. It also relates to a liquid crystal display device in which the liquid crystal composition is sealed between the substrates, and the polymerizable compound included in the liquid crystal composition is polymerized while a voltage applied to the liquid crystal layer is adjusted, and the orientation of liquid crystal molecules is fixed.

The technical field of the invention relates mainly to a liquid crystal composition suitable for use in an active matrix (AM) device and so forth, and an AM device and so forth that contain this composition. More specifically, it relates to a liquid crystal composition having negative dielectric anisotropy, and a device containing the composition and having an IPS (in-plane switching) mode, an FFS (fringe field switching) mode, a VA (vertical alignment) mode, a PSA (polymer sustained alignment) mode or an FPA (field induced photo-reactive alignment) mode. The VA mode includes a MVA (multi-domain vertical alignment) mode and a PVA (patterned vertical alignment) mode.

TECHNICAL BACKGROUND

In a liquid crystal display device, a classification based on an operating mode for liquid crystals includes modes such as PC (phase change), TN (twisted nematic), STN (super twisted nematic), ECB (electrically controlled birefringence), OCB (optically compensated bend), IPS (in-plane switching), FFS (fringe field switching), VA (vertical alignment), PSA (polymer sustained alignment) and ETA (field induced photo-reactive alignment). A classification based on a driving mode of the device includes PM (passive matrix) and AM (active matrix). The PM is further classified into static, multiplex and so forth, and the AM is classified into TFT (thin film transistor), MIM (metal-insulator-metal) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. This liquid crystal composition has a nematic phase. The general characteristics of the composition should be improved to give an AM device having good general characteristics. Table 1 below summarizes the relationship between these two general characteristics. The general characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Accordingly, a small viscosity of the composition is desirable. A small viscosity at a low temperature is more desirable.

TABLE 1

General Characteristics of Composition and AM Device

| No. | General Characteristics of Composition | General Characteristics of AM Device |
|---|---|---|
| 1 | wide temperature range of a nematic phase | wide temperature range in which a device can be used |
| 2 | small viscosity[1] | short response time |
| 3 | suitable optical anisotropy | large contrast ratio |
| 4 | large positive or large negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1] A liquid crystal composition can be injected into a liquid crystal display device in a shorter period of time.

The optical anisotropy of the composition relates to the contrast ratio of the device. The product (Δn×d) of the optical anisotropy (Δn) of the composition and the cell gap (d) of the device is designed so as to maximize the contrast ratio. A suitable value of the product depends on the kind of operating mode. In a device having a VA mode or a PSA mode, a suitable value is in the range of approximately 0.30 micrometer to approximately 0.40 micrometer, and in a device having an IPS mode, a suitable value is in the range of approximately 0.20 micrometer to approximately 0.30 micrometer. In these cases, a composition having a large optical anisotropy is desirable for a device having a small cell gap. A large absolute value of the dielectric anisotropy in the composition contributes to a low threshold voltage, small electric power consumption and a large contrast ratio of the device. Accordingly, a large absolute value of the dielectric anisotropy is desirable. A large specific resistance of the composition contributes to a large voltage holding ratio and a large contrast ratio of the device. Accordingly, it is desirable that a composition should have a large specific resistance at room temperature and also at a high temperature in the initial stage. It is desirable that a composition should have a large specific resistance at room temperature and also at a high temperature after it has been used for a long time. The stability of the composition to ultraviolet light and heat relates to the service life of the liquid crystal display device. In the case where the stability is high, the device has a long service life. Such characteristics are desirable for an AM device used in a liquid crystal projector, a liquid crystal television and so forth.

A composition having positive dielectric anisotropy is used for an AM device having a TN mode. In contrast, a composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device having a PSA mode or an FPA mode. Examples of a liquid crystal composition having negative dielectric anisotropy are disclosed in the following patent documents No. 1 to No. 5.

PRIOR ART

Patent Document

Patent document No. 1: JP 2004-131704 A.
Patent document No. 2: JP 2009-102639 A.
Patent document No. 3: WO 2010-084823 A.
Patent document No. 4: JP 2010-536894 A.
Patent document No. 5: JP 2010-537010 A.

A desirable AM device has characteristics such as a wide temperature range in which the device can be used, a short response time, a large contrast ratio, a low threshold voltage, a large voltage holding ratio and a long service life. Response time that is even one millisecond shorter than that of other devices is desirable. Thus, desirable characteristics of the composition include a high maximum temperature of a nematic phase, a low minimum temperature of a nematic phase, a small viscosity, a suitable optical anisotropy, a large positive or large negative dielectric anisotropy, a large specific resistance, a high stability to ultraviolet light and a high stability to heat.

In a liquid crystal display device having a PSA mode, a small amount (for example, approximately 0.3% by weight to approximately 1% by weight) of a polymerizable compound is added to the liquid crystal composition. The polymerizable compound is polymerized normally by irradiating with ultraviolet light while a voltage is applied between electrodes after the introduction to the liquid crystal display cell, and a polymer structure is formed in the device. A polymerizable mesogenic or liquid crystal compound is suitable for the polymerizable compound.

OUTLINE OF THE INVENTION

Subject to be Solved by the Invention

One of the objects of the invention is to provide a liquid crystal composition that includes a polymerizable compound and satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. Another object is to provide a liquid crystal composition that is suitably balanced between at least two of the characteristics. A further object is to provide a liquid crystal display device that contains such a composition. An additional object is to provide a composition that has a suitable optical anisotropy that means a small optical anisotropy or a large optical anisotropy, a large negative dielectric anisotropy, a high stability to ultraviolet light and so forth, and a AM device that has a short response time, a large pretilt angle, a small rate of screen burn-in, a low concentration of the polymerizable compound remained, a large voltage holding ratio, a large contrast ratio, a long service life and so forth by forming a polymer structure in the liquid crystal layer.

Means for Solving the Subject

The means are a liquid crystal composition that includes at least one compound selected from the group of compounds having three or more polymerizable groups as a first component and at least one compound selected from the group of compounds having one or two polymerizable groups as a second component and has a nematic phase, and a liquid crystal display device containing this composition.

Inventors focused a skeleton structure of a polymerizable compound for use in a liquid crystal display device in which a PSA technique is applied, combined at least one compound having three or more polymerizable groups in the ring structure and at least one compound having one or two polymerizable groups in the ring structure in a suitable ratio, and then found that the reactivity or the pretilt angle is improved or optimized, the PSA effect is exhibited effectively, and the ability to orient liquid crystal molecules is increased.

The invention is especially effective in improving performance of a VA type-liquid crystal display device in which a PSA technique is applied. A VA-type device using a PSA technique is a liquid crystal display apparatus that is produced via processes: two substrates equipped with transparent electrodes and alignment films for orienting liquid crystal molecules are prepared, and a liquid crystal composition including a polymerizable compound is arranged between these substrates, and then the polymerizable compound is polymerized while a voltage is applied between the opposing transparent electrodes of these substrates.

The response time can be decreased and the screen burn-in can be improved by the invention, since the polymer memorizes the orientation during voltage application and determines the falling direction of liquid crystal molecules. Since the polymerizable compound of the invention can be applicable to a variety of cell production processes, a poor display such as unevenness caused in the production process and a decrease in the contrast ratio is improved, which made it possible to produce a high quality of liquid crystal display devices.

Effect of the Invention

The advantage of the invention is a high stability to ultraviolet light or heat with regard to a polymer of a polymerizable mesogenic or liquid crystal compound. Another advantage of the invention is a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. One aspect of the invention is a liquid crystal composition that is suitably balanced between at least two of the characteristics. Another aspect is a liquid crystal display device that contains such a composition. A further aspect is a polymerizable compound having a high stability to ultraviolet light or heat, a composition having a suitable optical anisotropy, a large negative dielectric anisotropy, a high stability to ultraviolet light and so forth, and an AM device having a short response time, a large pretilt angle, a small rate of screen burn-in, a large voltage holding ratio, a large contrast ratio, a long service life and so forth.

EMBODIMENT TO CARRY OUT THE INVENTION

Usage of the terms in this specification is as follows. A liquid crystal composition and a liquid crystal display device may be abbreviated to "a composition" and "a device," respectively. "A liquid crystal display device" is a generic term for a liquid crystal display panel and a liquid crystal display module. A compound having a polymerizable group may be abbreviated to "a polymerizable compound." "A liquid crystal compound" is a generic term for a compound having a liquid crystal phase such as a nematic phase or a smectic phase, and also for a compound having no liquid crystal phases but being useful as a component of a composition. Such a useful compound has a six-membered ring such as 1,4-cyclohexylene and 1,4-phenylene, and a rod-like molecular structure. An optically active compound and a polymerizable compound may be added to a composition. These compounds are classified to an additive, even if they are liquid crystalline. At least one compound selected from the group of compounds represented by formula (1) may be abbreviated to "compound (1)." "Compound (1)" means one compound, or two or more compounds represented by formula (1). The same rules apply to compounds represented by other formulas. At least one group selected from the group of groups represented by formula (P-1) may be abbreviated to "group (P-1)." The same rules apply to groups represented by other formulas. The expression "at least one 'A' may be replaced by 'B'" means that the position of 'A' is arbitrary when the number of 'A' is one, and that the positions of 'A' can be selected without any restriction also when the number of 'A' is two or more.

A higher limit of the temperature range of a nematic phase may be abbreviated to "the maximum temperature." A lower limit of the temperature range of a nematic phase may be abbreviated to "the minimum temperature." That "specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "a voltage holding ratio is large" means that a device has a large voltage holding ratio at room temperature and also at a temperature close to the maximum temperature of a nematic phase in the initial stage, and that the device has a large voltage holding ratio at room temperature and also at a temperature close to the maximum temperature of a nematic phase even after it has been used for a long time. When characteristics such as optical anisotropy are explained, values obtained according to the measuring methods described in Examples will be used. A first component means one compound, or two or more compounds. "The ratio of the first component" is expressed as a weight ratio (parts by weight) of the first component, when the weight of the liquid crystal composition, excluding the first and second components, is defined as 100. A second component means one compound, or two or more compounds. "The ratio of the second component" is expressed as a weight ratio (parts by weight) of the second component, when the weight of the liquid crystal composition, excluding the first and second components, is defined as 100. "The ratio of the third component" is expressed as a percentage by weight (% by weight) of the third component based on the weight of the liquid crystal composition, excluding the first and second components. "The ratio of the fourth component" is expressed in the same manner as with "the ratio of the third component". The ratio of an additive mixed with the composition is expressed as a percentage by weight (% by weight) or weight parts per million (ppm) based on the total weight of the liquid crystal composition.

The symbol $R^5$ is used for a plurality of compounds in the chemical formulas of component compounds. Two terminal groups represented by arbitrary two of $R^5$ may be the same or different in these compounds. In one case, for example, $R^5$ of compound (3) is ethyl and $R^5$ of compound (3-1) is ethyl. In another case, $R^5$ of compound (3) is ethyl and $R^5$ of compound (3-1) is propyl. The same rule applies to the symbols such as $R^6$ and $P^3$.

The invention includes the following items.

Item 1. A liquid crystal composition having a nematic phase and including at least one compound selected from the group of compounds having three or more polymerizable groups as a first component and at least one compound selected from the group of compounds having one polymerizable group and compounds having two polymerizable groups as a second component.

Item 2. The liquid crystal composition according to item 1, including at least one compound selected from the group of compounds represented by formula (1) as the first component and at least one compound selected from the group of compounds represented by formula (2) as the second component:

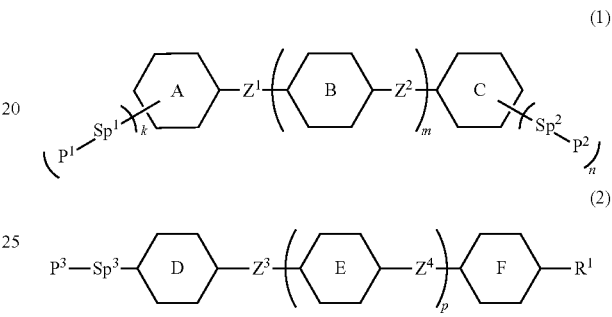

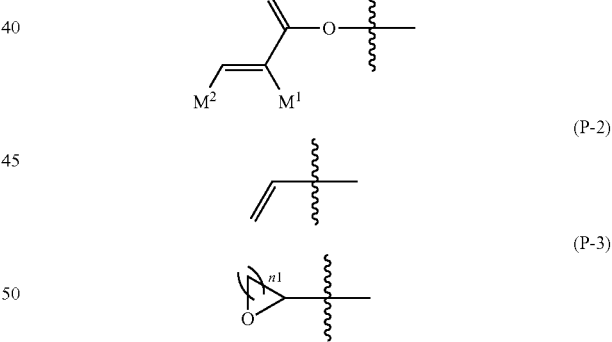

wherein $R^1$ is hydrogen, alkyl having 1 to 12 carbons, alkoxy having 1 to 12 carbons, alkenyl having 2 to 12 carbons, alkenyl having 2 to 12 carbons in which at least one hydrogen has been replaced by fluorine, or -$Sp^4$-$P^4$; $P^1$, $P^2$, $P^3$ and $P^4$ are independently a group selected from groups represented by formula (P-1), formula (P-2) and formula (P-3);

in formula (P-1), $M^1$ and $M^2$ are independently hydrogen, fluorine, methyl or —$CF_3$; in formula (P-3), $n^1$ is 1, 2, 3 or 4; $Sp^1$, $Sp^2$, $Sp^3$ and $Sp^4$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH═CH— or —C≡C—; $Z^1$, $Z^2$ and $Z^4$ are independently a single bond, ethylene, methyleneoxy or carbonyloxy; $Z^3$ is a single bond, ethylene, methyleneoxy, carbonyloxy, —CO—$CR^2$═$CR^3$—, —$CR^2$═$CR^3$—CO—, —$CR^2$═$CR^3$—, —C(═$CR^2R^3$)— or —C(═$R^4$)—; $R^2$ and $R^3$ are independently hydrogen, halogen, alkyl having 1 to 10 carbons or alkyl having 1 to 10 carbons in which at least one hydrogen has been replaced by fluorine; $R^4$ is a group selected from groups represented by formula (R-1);

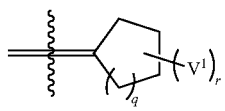
(R-1)

in formula (R-1), $V^1$ are independently halogen, alkyl having 1 to 6 carbons or alkyl having 1 to 6 carbons in which at least one hydrogen has been replaced by fluorine; q is an integer from 1 to 8; r is an integer from 0 to 4;

ring A is 1-cyclohexyl in which hydrogen may be replaced by $P^1$-$Sp^1$-, 1-phenyl in which hydrogen may be replaced by $P^1$-$Sp^1$- or 2-naphthyl in which hydrogen may be replaced by —$P^1$-$Sp^1$; ring C is 1-cyclohexyl in which hydrogen may be replaced by -$Sp^2$-$P^2$, 1-phenyl in which hydrogen may be replaced by -$Sp^2$-$P^2$ or 2-naphthyl in which hydrogen may be replaced by -$Sp^2$-$P^2$; ring D and ring F are independently 1,4-cyclohexylene, 1,4-phenylene, naphthalene-2,6-diyl, 2-fluoro-1,4-phenylene, 3-fluoro-1,4-phenylene, 2,3-difluoro-1,4-phenylene, 2-methyl-1,4-phenylene, 3-methyl-1,4-phenylene, 2-trifluoromethyl-1,4-phenylene or 3-trifluoromethyl-1,4-phenylene; ring B and ring E are independently 1,4-cyclohexylene, 1,4-phenylene, naphthalene-2,6-diyl, 2-fluoro-1,4-phenylene, 3-fluoro-1,4-phenylene, 2,3-difluoro-1,4-phenylene, 3,6-difluoro-1,4-phenylene, 2-methyl-1,4-phenylene, 3-methyl-1,4-phenylene, 2-trifluoromethyl-1,4-phenylene or 3-trifluoromethyl-1,4-phenylene; m is 0, 1 or 2; k is 0, 1, 2 or 3, n is 0, 1, 2 or 3, and the sum of k and n is 3 or 4; p is 0, 1 or 2; and at least one of $Sp^1$ and $Sp^2$ has —O— when both $P^1$ and $P^2$ are a group represented by formula (P-2) and $Sp^a$ has —O— when $P^3$ is a group represented by formula (P-2).

Item 3. The liquid crystal composition according to item 1 or 2, including at least one compound selected from the group of compounds represented by formula (1-1) to formula (1-5) as the first component:

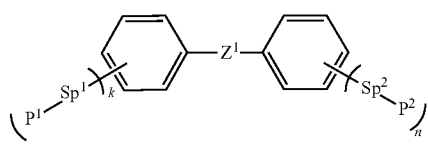
(1-1)

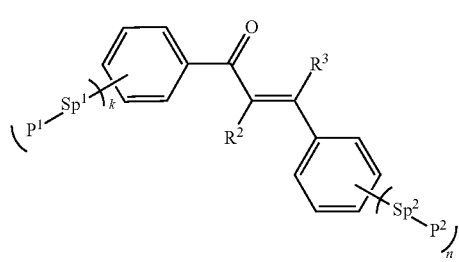
(1-2)

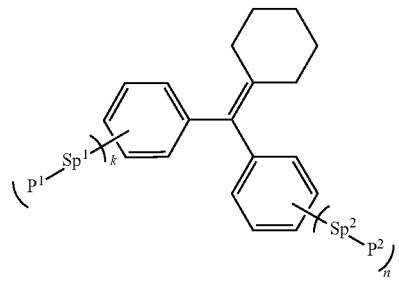
(1-3)

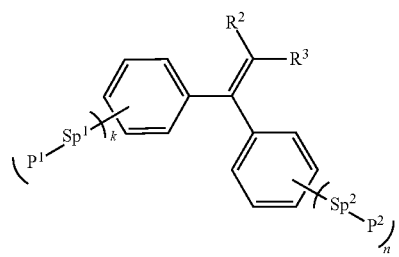
(1-4)

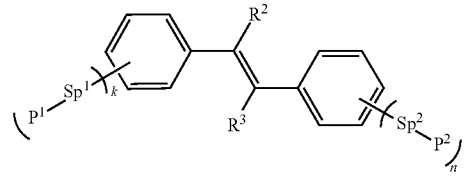
(1-5)

wherein $R^2$ and $R^3$ are independently hydrogen, halogen, alkyl having 1 to 10 carbons or alkyl having 1 to 10 carbons in which at least one hydrogen has been replaced by fluorine; $P^1$ and $P^2$ are independently a group selected from groups represented by formula (P-1), formula (P-2) and formula (P-3);

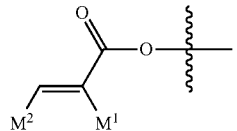
(P-1)

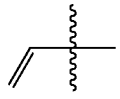
(P-2)

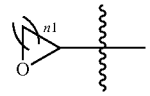
(P-3)

in formula (P-1), $M^1$ and $M^2$ are independently hydrogen, fluorine, methyl or —$CF_3$; in formula (P-3), $n^1$ is 1, 2, 3 or 4; $Sp^1$ and $Sp^2$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH=CH— or —C≡C—; $Z^1$ is a single bond, ethylene, methyleneoxy or carbonyloxy; k is 0, 1, 2 or 3, n is 0, 1, 2 or 3, and the sum of k and n is 3 or 4; and at least one of $Sp^1$ and $Sp^2$ has —O— when both $P^1$ and $P^2$ are a group represented by formula (P-2).

Item 4 The liquid crystal composition according to item 1 or 2, including at least one compound selected from the group of compounds represented by formula (I-6) as the first component:

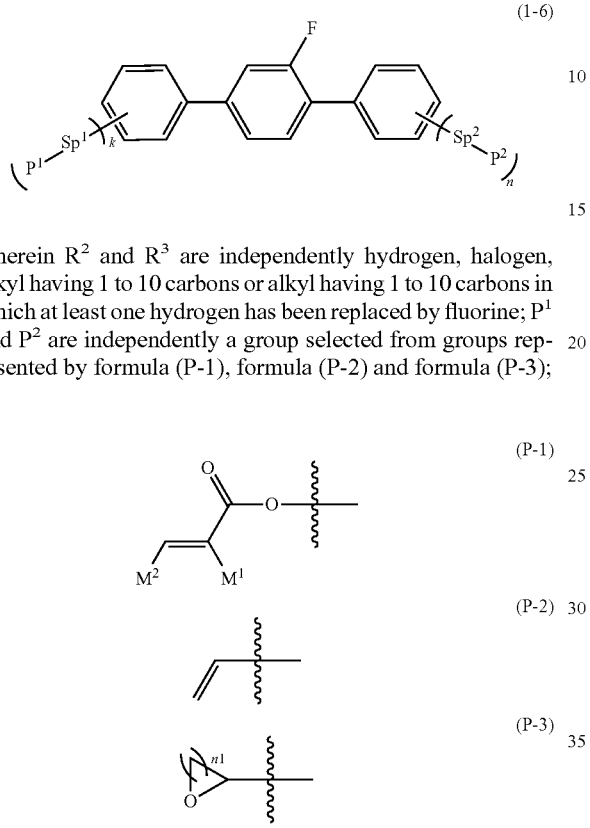

wherein $R^2$ and $R^3$ are independently hydrogen, halogen, alkyl having 1 to 10 carbons or alkyl having 1 to 10 carbons in which at least one hydrogen has been replaced by fluorine; $P^1$ and $P^2$ are independently a group selected from groups represented by formula (P-1), formula (P-2) and formula (P-3);

in formula (P-1), $M^1$ and $M^2$ are independently hydrogen, fluorine, methyl or —$CF_3$; in formula (P-3), $n^1$ is 1, 2, 3 or 4;

$Sp^1$ and $Sp^2$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH═CH— or —C≡C—; $Z^1$ is a single bond, ethylene, methyleneoxy or carbonyloxy; k is 0, 1, 2 or 3, n is 0, 1, 2 or 3, and the sum of k and n is 3 or 4; and at least one of $Sp^1$ and $Sp^2$ has —O— when both $P^1$ and $P^2$ are a group represented by formula (P-2).

Item 5. The liquid crystal composition according to any one of items 1 to 4, including at least one compound selected from the group of compounds represented by formula (I-1) according to item 3 as the first component.

Item 6. The liquid crystal composition according to any one of items 1 to 5, including at least one compound selected from the group of compounds represented by formula (I-2) according to item 3 as the first component.

Item 7. The liquid crystal composition according to any one of items 1 to 6, including at least one compound selected from the group of compounds represented by formula (2-1) to formula (2-22) as the second component:

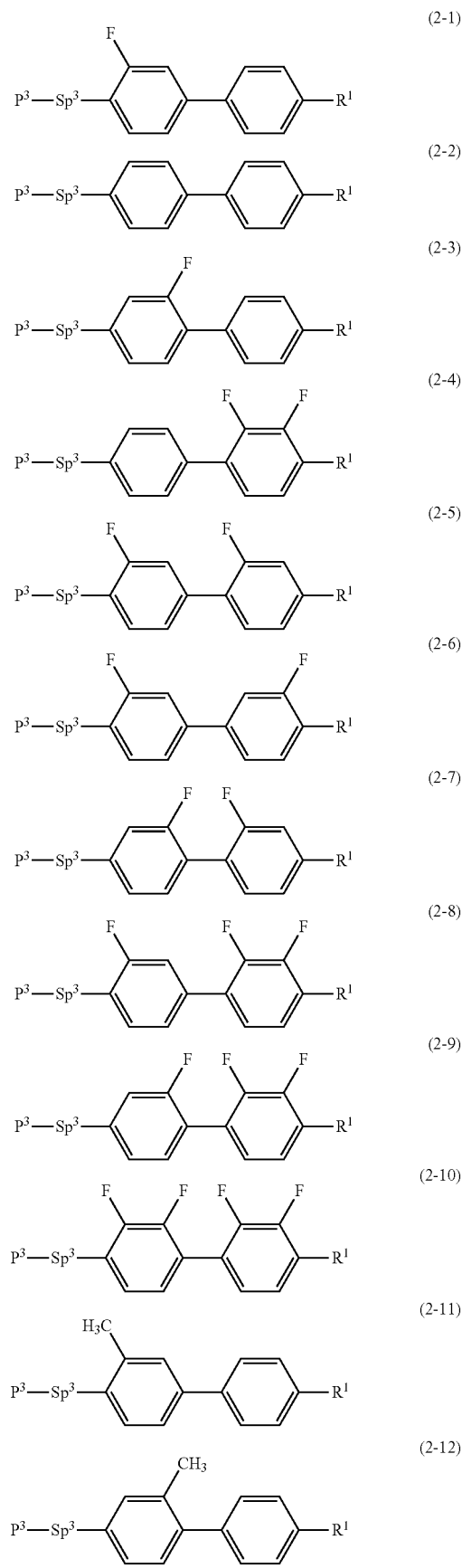

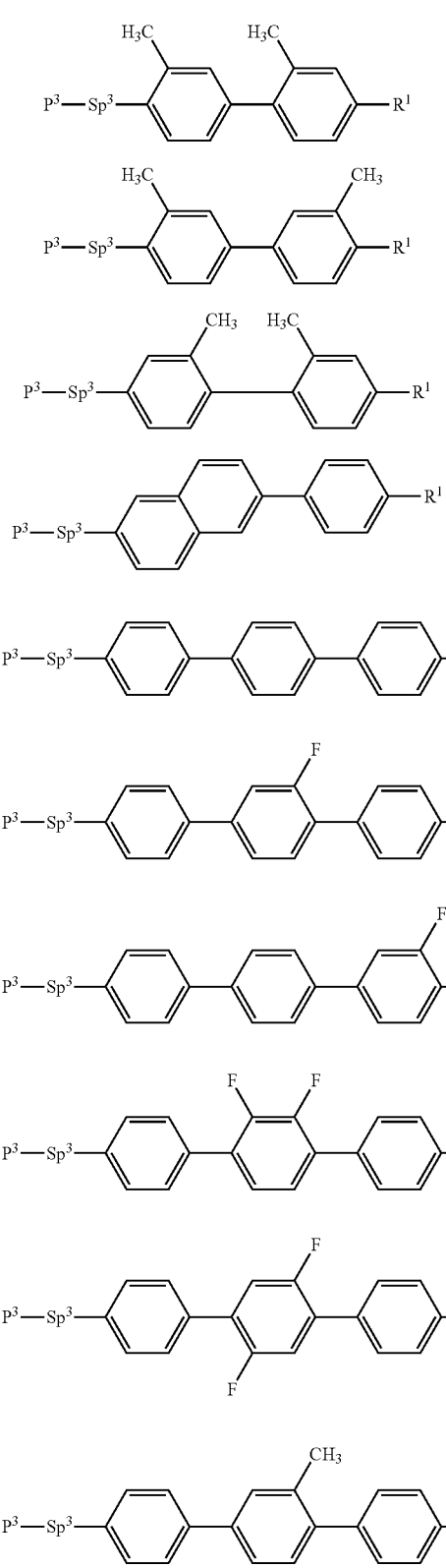

(2-13)
(2-14)
(2-15)
(2-16)
(2-17)
(2-18)
(2-19)
(2-20)
(2-21)
(2-22)

pendently a group selected from groups represented by formula (P-1), formula (P-2) and formula (P-3);

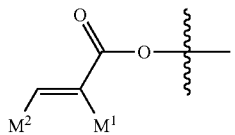
(P-1)

(P-2)

(P-3)

in formula (P-1), $M^1$ and $M^2$ are independently hydrogen, fluorine, methyl or —$CF_3$; in formula (P-3), $n^1$ is 1, 2, 3 or 4; $Sp^3$ and $Sp^4$ are independently a single bond or alkylene having 1 to 12 carbons, and in the alkylene, at least one hydrogen may be replaced by halogen or —C≡N, at least one —$CH_2$— may be replaced by —O—, —NH—, —CO—, —CO—O—, —O—CO— or —O—CO—O—, and at least one —$CH_2$—$CH_2$— may be replaced by —CH=CH— or —C≡C—; and $Sp^3$ has —O— when $P^3$ is a group represented by formula (P-2).

Item 8. The liquid crystal composition according to any one of items 1 to 7, including at least one compound selected from the group of compounds represented by formula (2-1) according to item 7 as the second component.

Item 9. The liquid crystal composition according to any one of items 1 to 8, including at least one compound selected from the group of compounds represented by formula (2-2) according to item 7 as the second component.

Item 10. The liquid crystal composition according to any one of items 1 to 9, including at least one compound selected from the group of compounds represented by formula (2-3) according to item 7 as the second component.

Item 11. The liquid crystal composition according to any one of items 1 to 10, including at least one compound selected from the group of compounds represented by formula (2-18) according to item 7 as the second component.

Item 12. The liquid crystal composition according to any one of items 1 to 11, wherein the ratio of the first and second components in total is in the range of 0.03 part by weight to 10 parts by weight based on the liquid crystal composition, excluding the first and second components.

Item 13. The liquid crystal composition according to any one of items 1 to 12, further including at least one compound selected from the group of compounds represented by formula (3) as a third component:

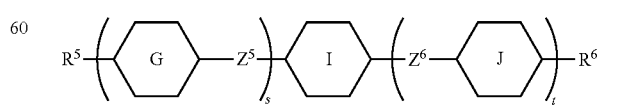
(3)

wherein $R^1$ is hydrogen, alkyl having 1 to 12 carbons, alkoxy having 1 to 12 carbons, alkenyl having 2 to 12 carbons, alkenyl having 2 to 12 carbons in which at least one hydrogen has been replaced by fluorine, or -$Sp^4$-$P^4$; $P^3$ and $P^4$ are independently wherein $R^5$ and $R^6$ are independently alkyl having 1 to 12 carbons, alkoxy having 1 to 12 carbons, alkenyl having 2 to 12 carbons or alkenyloxy having 2 to 12 carbons; ring G and ring J are independently 1,4-cyclohexylene, tetrahydropyran-2,5-diyl, 1,4-phenylene, or 1,4-phenylene in which at least one hydrogen has been replaced by fluorine or chlorine; ring I is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^5$ and $Z^6$ are independently a single bond, ethylene, methyleneoxy or carbonyloxy; and s is 1, 2 or 3, t is 0 or 1 and the sum of s and t is 3 or less.

Item 14. The liquid crystal composition according to any one of items 1 to 13, including at least one compound selected from the group of compounds represented by formula (3-1) to formula (3-19) as the third component:

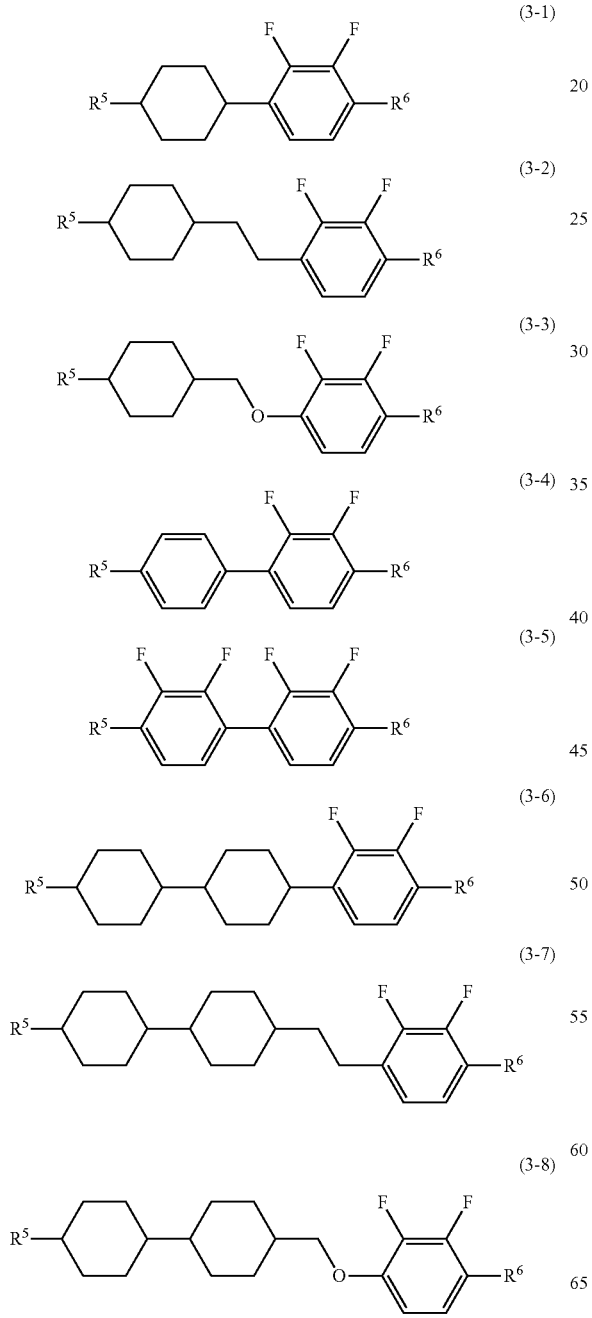
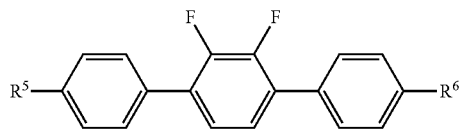
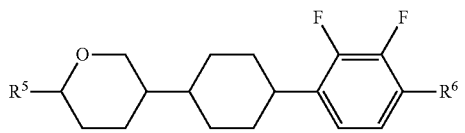
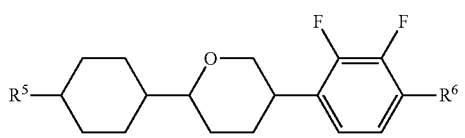
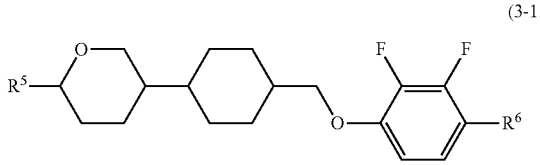
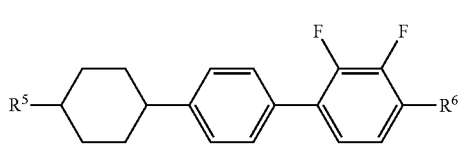
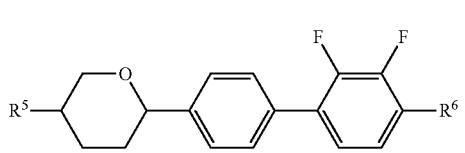
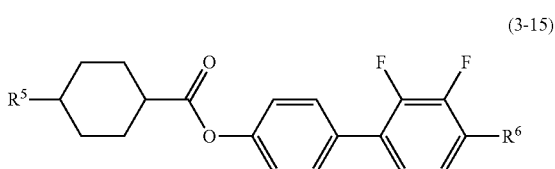
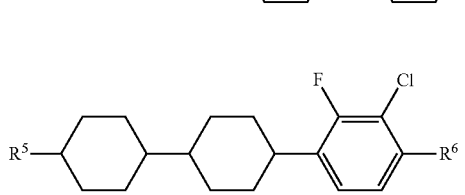
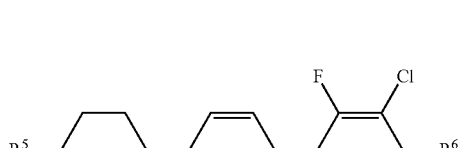
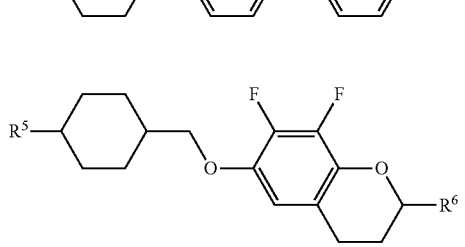

-continued (3-19)

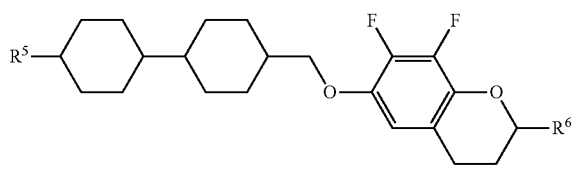

wherein $R^5$ and $R^6$ are independently alkyl having 1 to 12 carbons, alkoxy having 1 to 12 carbons, alkenyl having 2 to 12 carbons or alkenyloxy having 2 to 12 carbons.

Item 15. The liquid crystal composition according to any one of items 1 to 14, including at least one compound selected from the group of compounds represented formula (3-4) according to item 14 as the third component.

Item 16. The liquid crystal composition according to any one of items 1 to 15, including at least one compound selected from the group of compounds represented formula (3-6) according to item 14 as the third component.

Item 17. The liquid crystal composition according to any one of items 1 to 16, including at least one compound selected from the group of compounds represented formula (3-8) according to item 14 as the third component.

Item 18. The liquid crystal composition according to any one of items 1 to 17, including at least one compound selected from the group of compounds represented formula (3-11) according to item 14 as the third component.

Item 19. The liquid crystal composition according to any one of items 13 to 18, wherein the ratio of the third component is in the range of 10% by weight to 90% by weight based on the liquid crystal composition, excluding the first and second components.

Item 20. The liquid crystal composition according to any one of items 1 to 19, further including at least one compound selected from the group of compounds represented formula (4) as a fourth component:

(4)

$$R^7-\left(\boxed{K}-Z^7\right)_u-\boxed{L}-Z^8-\boxed{M}-R^8$$

wherein $R^7$ and $R^8$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine; ring K, ring L and ring M are independently 1,4-cyclohexylene, 1,4-phenylene, 2-fluoro-1,4-phenylene or 3-fluoro-1,4-phenylene; $Z^7$ and $Z^8$ are independently a single bond, ethylene, methyleneoxy or carbonyloxy; and u is 0, 1 or 2.

Item 21. The liquid crystal composition according to any one of items 1 to 20, including at least one compound selected from the group of compounds represented by formula (4-1) to formula (4-13) as the fourth component:

(4-1)

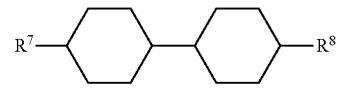

(4-2)

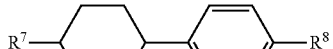

(4-3)

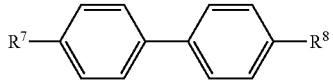

(4-4)

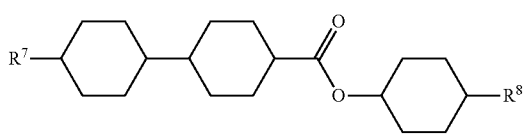

(4-5)

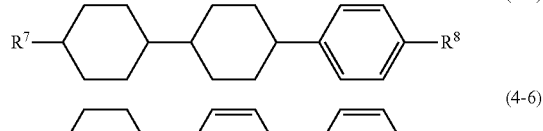

(4-6)

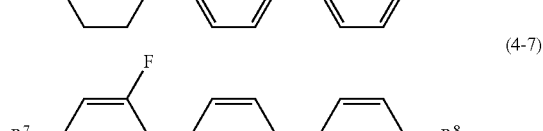

(4-7)

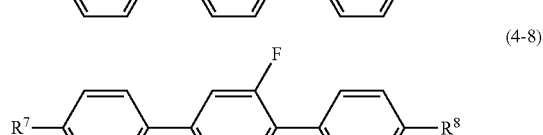

(4-8)

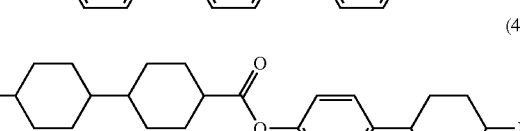

(4-9)

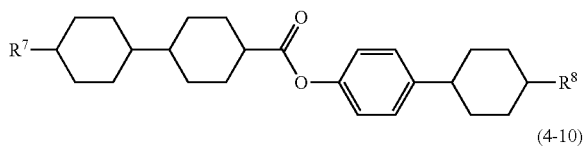

(4-10)

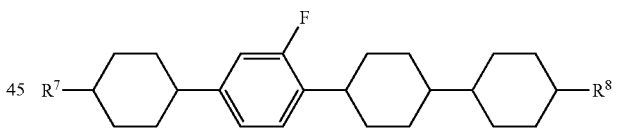

(4-11)

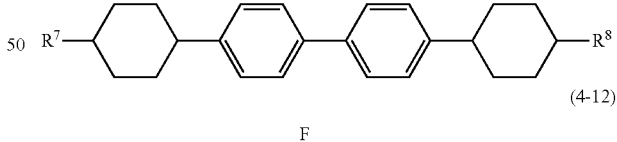

(4-12)

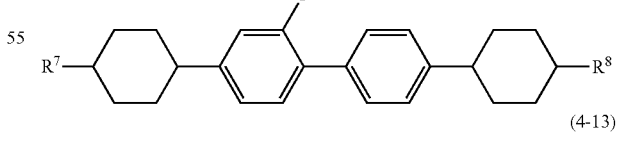

(4-13)

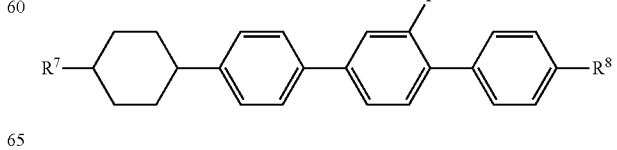

wherein $R^7$ and $R^8$ are independently alkyl having 1 to 12 carbons, alkoxy having 1 to 12 carbons, alkenyl having 2 to carbons or alkenyl having 2 to 12 carbons in which at least one hydrogen has been replaced by fluorine.

Item 22. The liquid crystal composition according to any one of items 1 to 21, including at least one compound selected from the group of compounds represented formula (4-1) according to item 21 as the fourth component.

Item 23. The liquid crystal composition according to any one of items 1 to 22, including at least one compound selected from the group of compounds represented formula (4-5) according to item 21 as the fourth component.

Item 24. The liquid crystal composition according to any one of items 20 to 23, wherein the ratio of the fourth component is in the range of 10% by weight to 90% by weight based on the liquid crystal composition, excluding the first and second components.

Item 25. The liquid crystal composition according to any one of items 1 to 24, wherein the weight ratio of the first component to the second component is in the range of 9:1 to 2:8.

Item 26. The liquid crystal composition according to any one of items 1 to 25, further including a polymerization initiator.

Item 27. The liquid crystal composition according to any one of items 1 to 26, further including a polymerization inhibitor.

Item 28. The liquid crystal composition according to any one of items 1 to 27, wherein the maximum temperature of a nematic phase is 70° C. or higher, the optical anisotropy (measured at 25° C.) at a wavelength of 589 nanometers is 0.08 or more, and the dielectric anisotropy (measured at 25° C.) at a frequency of 1 kHz is −2 or less.

Item 29. A polymer sustained alignment type (PSA) liquid crystal display device, wherein the device is composed of two substrates where at least one of the substrates has an electrode layer, a liquid crystal composition according to any one of items 1 to 28 is arranged between these two substrates, and a compound having a polymerizable group included in the liquid crystal composition is polymerized.

Item 30. The liquid crystal display device according to item 29, wherein an operating mode of the liquid crystal display device is a VA mode, an IPS mode, an FFS mode or an FPA mode, and a driving mode of the liquid crystal display device is an active matrix mode.

Item 31. Method for producing a liquid crystal display device, wherein the liquid crystal display device according to item 29 is produced by arranging a liquid crystal composition according to any one of items 1 to 28, between the two substrates, by irradiating with light under the conditions of an applied voltage, and by polymerizing a compound having a polymerizable group.

Item 32. Use of the liquid crystal composition according to any one of items 1 to 28 in a liquid crystal display device.

The invention also includes the following items: (1) The composition described above, further including an optically active compound; (2) The composition described above, further including an additive, such as an antioxidant, an ultraviolet light absorber and/or an antifoaming agent; (3) An AM device containing the composition described above; (4) A device containing the composition described above and having a mode of TN, ECB, OCB, IPS, FFS, VA, PSA or FPA; (5) A transmission-type device containing the composition described above; (6) Use of the composition described above, as a composition having a nematic phase; and (7) Use of the composition prepared by the addition of an optically active compound to the composition described above, as an optically active composition.

The composition of the invention will be explained in the following order. First, the constitution of component compounds in the composition will be explained. Second, the main characteristics of the component compounds and the main effects of these compounds on the composition will be explained. Third, a combination of components in the composition, desirable ratios of the components and the basis thereof will be explained. Fourth, a desirable embodiment of the component compounds will be explained. Fifth, specific examples of the component compounds will be shown. Sixth, additives that may be mixed with the composition will be explained. Seventh, methods for synthesizing the component compounds will be explained. Last, the use of the composition will be explained.

First, the constitution of component compounds in the composition will be explained. The compositions of the invention are classified into composition A and composition B. Composition A may further include any other liquid crystal compound, an additive and an impurity, in addition to liquid crystal compounds selected from compound (1), compound (2), compound (3) and compound (4). "Any other liquid crystal compound" is a liquid crystal compound that is different from compound (1), compound (2), compound (3) and compound (4). Such a compound is mixed with the composition for the purpose of further adjusting the characteristics. Of any other liquid crystal compound, a smaller amount of a cyano compound is desirable in view of its stability to heat or ultraviolet light. A more desirable ratio of the cyano compound is 0% by weight. The additive includes an optically active compound, an antioxidant, an ultraviolet light absorber, a coloring matter, an antifoaming agent and a polymerization initiator. The impurity is compounds and so forth which have contaminated component compounds in a process such as their synthesis. Even in the case where the compound is liquid crystalline, it is classified into the impurity herein.

Composition B consists essentially of compounds selected from the group of compound (1), compound (2), compound (3) and compound (4). The term "essentially" means that the composition may include an additive and an impurity, but does not include any liquid crystal compound that is different from those compounds. Composition B has a smaller number of components than composition A. Composition B is preferable to composition A in view of cost reduction. Composition A is preferable to composition B in view of the fact that characteristics can be further adjusted by adding any other liquid crystal compound.

Second, the main characteristics of the component compounds and the main effects of the compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classified according to a qualitative comparison among the component compounds, and 0 (zero) means that "a value is nearly zero."

TABLE 2

| Characteristics of Compounds | | |
|---|---|---|
| Compounds | Compound (3) | Compound (4) |
| Maximum Temperature | S-L | S-L |
| Viscosity | M-L | S-M |
| Optical Anisotropy | M-L | S-L |
| Dielectric Anisotropy | M-L[1] | 0 |
| Specific Resistance | L | L |

[1]Value of optical anisotropy is negative, and the symbol expresses the magnitude of the absolute value.

The main effects of the component compounds on the characteristics of the composition upon mixing the component compounds with the composition are as follows. Compound (3) increases the absolute value of the dielectric anisotropy and decreases the minimum temperature. Compound (4) decreases the viscosity, or increases the maximum temperature and decreases the minimum temperature.

Third, a combination of the components in the composition, a desirable ratio of each component and the basis thereof will be explained. A desirable combination of the components in the composition is the first and second components, the first, second and third components, the first, second and fourth components, and the first, second, third and fourth components.

A desirable ratio of the first and second components in total is approximately 0.03 part by weight or more for orienting liquid crystal molecules, and approximately 10 parts by weight or less for preventing a poor display, based on 100 parts by weight of the liquid crystal composition, excluding the first and second components. A more desirable ratio is in the range of approximately 0.1 part by weight to approximately 2 parts by weigh.

A desirable weight ratio of the first component to the second component is in the range of 9:1 to 2:8 for orienting liquid crystal molecules. A more desirable weight ratio is in the range of 9:1 to 3:7. An especially desirable weight ratio is in the range of 8:2 to 4:6.

A desirable ratio of the third component is approximately 10% by weight or more for increasing the absolute value of the dielectric anisotropy and approximately 90% by weight or less for decreasing the minimum temperature, based on the liquid crystal composition, excluding the first and second components. A more desirable ratio is in the range of approximately 20% by weight to approximately 80% by weight. An especially desirable ratio is in the range of approximately 30% by weight to approximately 70% by weight.

A desirable ratio of the fourth component is approximately 10% by weight or more for decreasing the viscosity or for increasing the maximum temperature, and approximately 90% by weight or less for increasing the absolute value of the dielectric anisotropy, based on the liquid crystal composition, excluding the first and second components. A more desirable ratio is in the range of approximately 20% by weight to approximately 80% by weight. An especially desirable ratio is in the range of approximately 30% by weight to approximately 70% by weight.

Fourth, a desirable embodiment of the component compounds will be explained. $R^1$ is hydrogen, alkyl having 1 to 12 carbons, alkoxy having 1 to 12 carbons, alkenyl having 2 to 12 carbons, alkenyl having 2 to 12 carbons in which at least one hydrogen has been replaced by fluorine, or -Sp$^4$-P$^4$. Desirable $R^1$ is -Sp$^4$-P$^4$ for increasing the reactivity.

$R^2$ and $R^3$ are independently hydrogen, halogen, alkyl having 1 to 10 carbons or alkyl having 1 to 10 carbons in which at least one hydrogen has been replaced by fluorine. Desirable $R^2$ or $R^3$ is hydrogen, fluorine or alkyl having 1 to 3 carbons for increasing the photo-reactivity. $R^4$ is a group selected from the group of groups represented by formula (R-1).

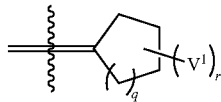
(R-1)

A wavy line in formula (R-1) shows a binding site as a group. $V^1$ is halogen, alkyl having 1 to 6 carbons or alkyl having 1 to 6 carbons in which at least one hydrogen has been replaced by fluorine, and arbitrary two of $V^1$ may be the same or different when r is 2, 3 or 4. Desirable $V^1$ is fluorine or alkyl having 1 to 3 carbons. q is an integer from 1 to 8. Desirable q is 1 or 2 for increasing the photo-reactivity. r is an integer from 0 to 4. Desirable r is an integer from 0 to 2 for increasing the photo-reactivity. More desirable r is 0.

$R^5$ and $R^6$ are independently alkyl having 1 to 12 carbons, alkoxy having 1 to 12 carbons, alkenyl having 2 to 12 carbons or alkenyloxy having 2 to 12 carbons. Desirable $R^5$ or $R^6$ is alkyl having 1 to 12 carbons for increasing the stability to ultraviolet light or for increasing the stability to heat and alkoxy having 1 to 12 carbons for increasing the absolute value of the dielectric anisotropy. $R^7$ and $R^8$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine. Desirable $R^7$ or $R^8$ is alkenyl having 2 to 12 carbons for decreasing the viscosity, and alkyl having 1 to 12 carbons for increasing the stability to ultraviolet light or for increasing the stability to heat.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity, for instance. C is preferable in the alkenyl such as 2-butenyl, 2-pentenyl and 2-hexenyl. In the alkenyl, straight-chain alkenyl is preferable to branched-chain alkenyl.

Desirable examples of alkenyl in which at least one hydrogen has been replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

The alkyl does not include cyclic alkyl. The alkoxy does not include cyclic alkoxy. The alkenyl does not include cyclic alkenyl. With regard to the configuration of 1,4-cyclohexylene, trans is preferable to cis for increasing the maximum temperature.

$P^1$, $P^2$, $P^3$ and $P^4$ are independently a group selected from groups represented by formula (P-1), formula (P-2) and formula (P-3). Arbitrary two of $P^1$ may be the same or different when k is 2 or 3, and arbitrary two of $P^2$ may be the same or different when n is 2 or 3.

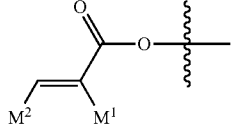
(P-1)

(P-2)

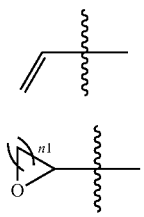

(P-3)

A wavy line in formula (P-1), formula (P-2) or formula (P-3) shows a binding site as a group.

In formula (P-1), $M^1$ and $M^2$ are independently hydrogen, fluorine, methyl or —$CF_3$. Desirable $M^1$ or $M^2$ is hydrogen or methyl for increasing the reactivity. More desirable $M^1$ is methyl, and more desirable $M^2$ is hydrogen. In formula (P-3), $n^1$ is 1, 2, 3 or 4. Desirable $n^1$ is 1 or 2 for increasing the reactivity. More desirable $n^1$ is 1.

Desirable $P^1$, $P^2$, $P^3$ or $P^4$ is group (P-1) for increasing the reactivity or for decreasing the response time, and group (P-2) for increasing the solubility in a liquid crystal composition.

$Sp^1$, $Sp^2$, $Sp^3$ and $Sp^4$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH=CH— or —C≡C—. The sum of carbons of alkylene in which hydrogen has been replaced by —C≡N is preferably up to twelve. Arbitrary two of $Sp^1$ may be the same or different when k is 2 or 3, and arbitrary two of $Sp^2$ may be the same or different when n is 2 or 3. Desirable $Sp^1$, $Sp^2$, $Sp^3$ or $Sp^4$ is a single bond for increasing the photo-reactivity.

At least one of $Sp^1$ and $Sp^2$ has —O— when both $P^1$ and $P^2$ is a group represented by formula (P-2). $Sp^3$ has —O— when $P^3$ is a group represented by formula (P-2). In the expression "has —O—", —O— means oxygen of —O—, —CO—O—, —O—CO— or —O—CO—O—.

Ring A is 1-cyclohexyl in which hydrogen may be replaced by $P^1$-$Sp^1$-, 1-phenyl in which hydrogen may be replaced by or 2-naphthyl in which hydrogen may be replaced by $P^1$-$Sp^1$-. Desirable ring A is 1-phenyl in which hydrogen at the 4-position has been replaced by $P^1$-$Sp^1$-, 1-phenyl in which hydrogen at the 3- and 4-positions has been replaced by $P^1$-$Sp^1$-, or 1-phenyl in which hydrogen at the 3- and 5-positions has been replaced by $P^1$-$Sp^1$-.

Ring C is 1-cyclohexyl in which hydrogen may be replaced by -$Sp^2$-$P^2$, 1-phenyl in which hydrogen may be replaced by -$Sp^2$-$P^2$ or 2-naphthyl in which hydrogen may be replaced by -$Sp^2$-$P^2$. Desirable ring C is 1-phenyl in which hydrogen at the 4-position has been replaced by -$Sp^2$-$P^2$, 1-phenyl in which hydrogen at the 3- and 4-positions has been replaced by -$Sp^2$-$P^2$, or 1-phenyl in which hydrogen at the 3- and 5-positions has been replaced by -$Sp^2$-$P^2$.

Ring D and ring F are independently 1,4-cyclohexylene, 1,4-phenylene, naphthalene-2,6-diyl, 2-fluoro-1,4-phenylene, 3-fluoro-1,4-phenylene, 2,3-difluoro-1,4-phenylene, 2-methyl-1,4-phenylene, 3-methyl-1,4-phenylene, 2-trifluoromethyl-1,4-phenylene or 3-trifluoromethyl-1,4-phenylene. Desirable ring D or ring F is 1,4-phenylene, naphthalene-2,6-diyl, 2-fluoro-1,4-phenylene, 3-fluoro-1,4-phenylene, 2,3-difluoro-1,4-phenylene, 2-methyl-1,4-phenylene, 3-methyl-1,4-phenylene. Especially desirable ring D or ring F is 1,4-phenylene, 2-fluoro-1,4-phenylene or 3-fluoro-1,4-phenylene.

Ring B and ring E are 1,4-cyclohexylene, 1,4-phenylene, naphthalene-2,6-diyl, 2-fluoro-1,4-phenylene, 3-fluoro-1,4-phenylene, 2,3-difluoro-1,4-phenylene, 3,6-difluoro-1,4-phenylene, 2-methyl-1,4-phenylene, 3-methyl-1,4-phenylene, 2-trifluoromethyl-1,4-phenylene or 3-trifluoromethyl-1,4-phenylene. Two of ring B may be the same or different when m is 2, and two of ring E may be the same or different when p is 2. Desirable ring B or ring E is 1,4-phenylene, 2-fluoro-1,4-phenylene, 3-fluoro-1,4-phenylene, 2,3-difluoro-1,4-phenylene, 3,6-difluoro-1,4-phenylene, 2-methyl-1,4-phenylene or 3-methyl-1,4-phenylene. Especially desirable ring B or ring E is 1,4-phenylene, 2-fluoro-1,4-phenylene or 3-fluoro-1,4-phenylene.

Ring G and ring J are independently 1,4-cyclohexylene, tetrahydropyran-2,5-diyl, 1,4-phenylene, or 1,4-phenylene in which at least one hydrogen has been replaced by fluorine or chlorine, and arbitrary two of ring G may be the same or different when s is 2 or 3. Desirable ring G or ring J is 1,4-cyclohexylene for decreasing the viscosity, tetrahydropyran-2,5-diyl for increasing the absolute value of the dielectric anisotropy, and 1,4-phenylene for increasing the optical anisotropy. Tetrahydropyran-2,5-diyl is

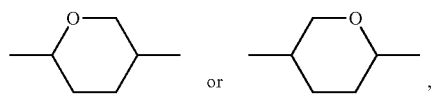 or , and is preferably

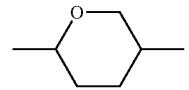.

Ring I is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring I is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the absolute value of the dielectric anisotropy.

Ring K, ring L and ring M are independently 1,4-cyclohexylene, 1,4-phenylene, 2-fluoro-1,4-phenylene or 3-fluoro-1,4-phenylene, and two of ring K may be the same or different when u is 2. Desirable ring K, ring L or ring M is 1,4-cyclohexylene for decreasing the viscosity or for increasing the maximum temperature, and 1,4-phenylene for decreasing the minimum temperature.

$Z^1$, $Z^2$ and $Z^4$ are independently a single bond, ethylene, methyleneoxy or carbonyloxy. Two of $Z^2$ may be the same or different when m is 2, and two of $Z^4$ may be the same or different when p is 2. Desirable $Z^1$, $Z^2$ or $Z^4$ is a single bond for increasing the reactivity.

$Z^3$ is a single bond, ethylene, methyleneoxy, carbonyloxy, —CO—$CR^2$=$CR^3$—, —$CR^2$=$CR^3$—CO—, —$CR^2$=$CR^3$—, —C(=$CR^2R^3$)— or —C(=$R^4$)—. Desirable $Z^3$ is —CO—$CR^2$=$CR^3$—, —$CR^2$=$CR^3$— or —C(=$R^4$)— for increasing the polymerizability of a polymerizable compound and for decreasing the response time of a device, $Z^5$ and $Z^6$ are independently a single bond, ethylene, methyleneoxy or carbonyloxy; and arbitrary two of $Z^5$ may be the same or different when s is 2 or 3. Desirable $Z^5$ or $Z^6$ is a single bond for decreasing the viscosity, ethylene for decreasing the minimum temperature, and methyleneoxy for increasing the absolute value of the dielectric anisotropy.

$Z^7$ and $Z^8$ are independently a single bond, ethylene, methyleneoxy or carbonyloxy, and two of $Z^7$ may be the same or different when u is 2. Desirable $Z^7$ or $Z^8$ is a single bond for decreasing the viscosity, ethylene for decreasing the minimum temperature, and carbonyloxy for increasing the maximum temperature.

k and n are independently 0, 1, 2 or 3 and the sum of k and n is 3 or 4. Desirable k or n is 1 or 2 for increasing the reactivity. A desirable sum of k and n is 4 for increasing the reactivity. m and p are independently 0, 1 or 2. Desirable m or p is 0 for decreasing the minimum temperature.

s is 1, 2 or 3. Desirable s is 1 for decreasing the viscosity, and is 2 or 3 for increasing the maximum temperature. t is 0 or 1. Desirable t is 0 for decreasing the viscosity and is 1 for decreasing the minimum temperature. u is 0, 1 or 2. Desirable u is 0 for decreasing the viscosity, and is 1 or 2 for increasing the maximum temperature.

Fifth, specific examples of the component compounds will be shown. In the desirable compounds described below, $P^5$, $P^6$, $P^7$, $P^8$, $P^9$ and $P^{10}$ independently a group selected from groups represented by formula (P-1-1) and formula (P-2).

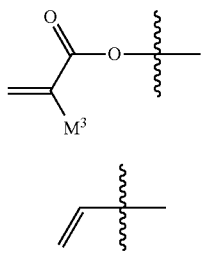
(P-1-1)

(P-2)

A wavy line in formula (P-1-1) or formula (P-2) shows a binding site as a group. In formula (p-1-1), $M^3$ is hydrogen or methyl.

$Sp^5$, $Sp^6$, $Sp^7$, $Sp^8$, $Sp^9$ and $Sp^{10}$ are independently a single bond or alkylene having 1 to 12 carbons, and in the alkylene, at least one —$CH_2$— may be replaced by —O—, —S—, —NH—, —CO—, —CO—O—, —O—CO— or —O—CO—O—, and at least one —$CH_2$—$CH_2$— may be replaced by —CH=CH— or —C≡C—. In formula (1-1-1) and formula (1-1-2), at least one of $Sp^5$, $Sp^6$, $Sp^7$ and $Sp^8$ has —O— when all of $P^5$, $P^6$, $P^7$ and $P^8$ are a group represented by formula (P-2), and in formula (1-2-1) to formula (1-5-1), at least one of $Sp^5$, $Sp^6$ and $Sp^7$ has —O— when all of $P^5$, $P^6$ and $P^7$ are a group represented by formula (P-2), and at least one of $Sp^9$ and $Sp^{10}$ has —O— when both $P^9$ and $P^{10}$ is a group represented by formula (P-2). $R^9$ and $R^{10}$ are independently hydrogen or alkyl having 1 to 3 carbons. $R^{11}$ is straight-chain alkyl having 1 to 12 carbons or straight-chain alkenyl having 2 to 12 carbons. $R^{12}$ is straight-chain alkyl having 1 to 12 carbons or straight-chain alkoxy having 1 to 12 carbons. $R^{13}$ and $R^{14}$ are independently straight-chain alkyl having 1 to 12 carbons, straight-chain alkoxy having 1 to 12 carbons or straight-chain alkenyl having 2 to 12 carbons.

Desirable compound (1) is compound (1-1-1), compound (1-1-2) and compound (1-2-1) to compound (1-6-1). More desirable compound (1) is compound (1-1-1), compound (1-1-2), compound (1-2-1) and compound (1-6-1). Especially desirable compound (1) is compound (1-1-1), compound (1-2-1) and compound (1-6-1). Desirable compound (2) is compound (2-1-1) to compound (2-22-1). More desirable compound (2) is compound (2-1-1), compound (2-2-1), compound (2-3-1), compound (2-4-1), compound (2-5-1), compound (2-6-1), compound (2-7-1), compound (2-18-1) and compound (2-19-1). Especially desirable compound (2) is compound (2-1-1), compound (2-2-1), compound (2-3-1) and compound (2-18-1). Desirable compound (3) is compound (3-1-1) to compound (3-19-1). More desirable compound (3) is compound (3-1-1), compound (3-2-1), compound (3-3-1), compound (3-4-1), compound (3-6-1), compound (3-8-1), compound (3-9-1) and compound (3-13-1). Especially desirable compound (3) is compound (3-1-1), compound (3-4-1), compound (3-6-1), compound (3-8-1) and compound (3-9-1). Desirable compound (4) is compound (4-1-1) to compound (4-13-1). More desirable compound (4) is compound (4-1-1) to compound (4-3-1), compound (4-5-1) and compound (4-7-1). Especially desirable compound (4) is compound (4-1-1) and compound (4-5-1).

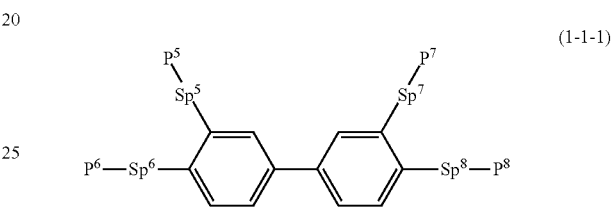
(1-1-1)

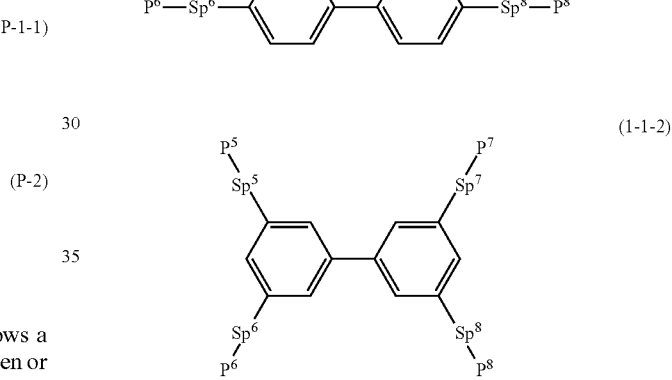
(1-1-2)

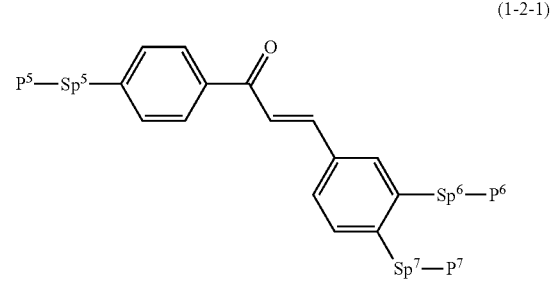
(1-2-1)

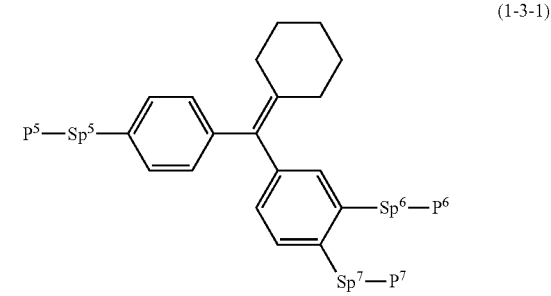
(1-3-1)

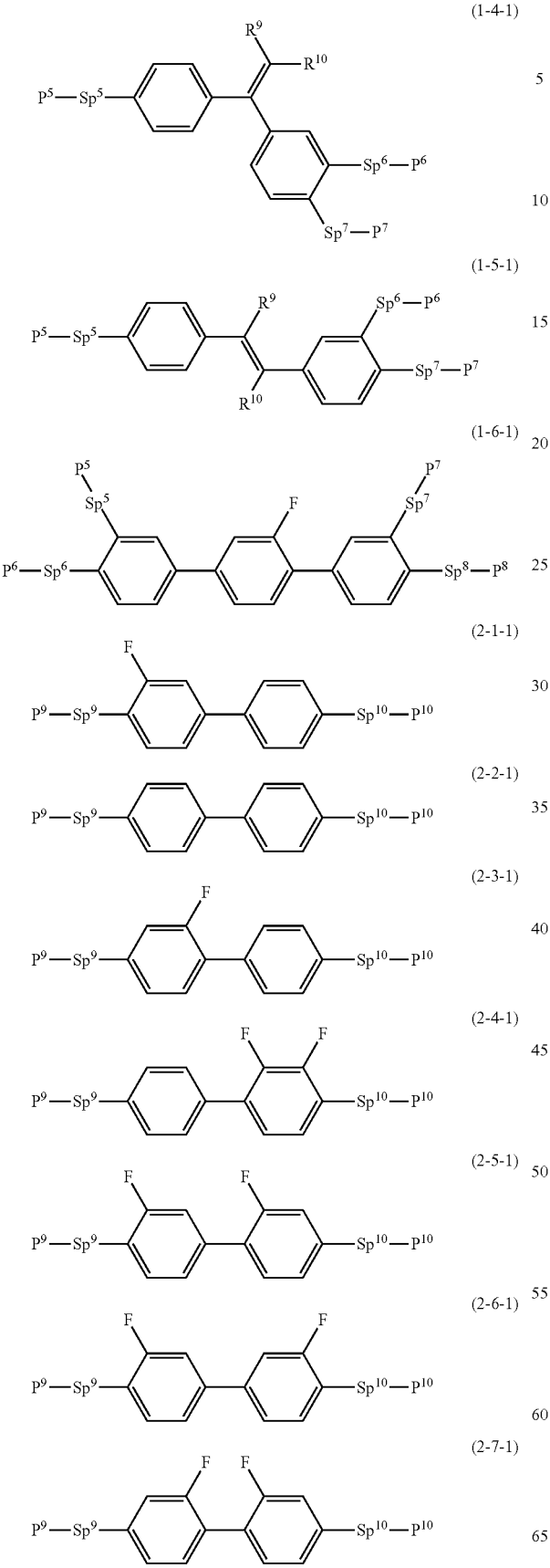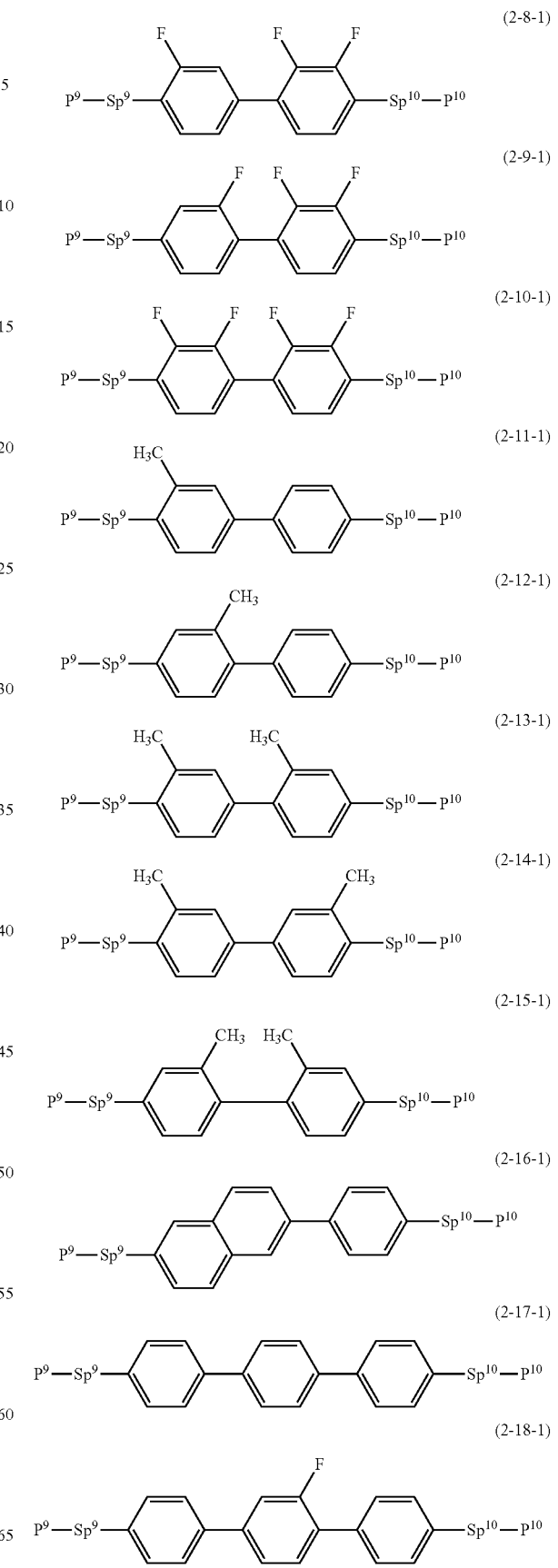

(2-19-1) 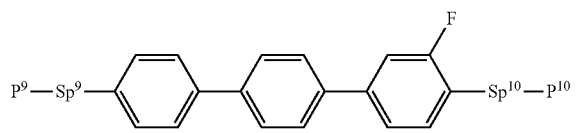
(2-20-1) 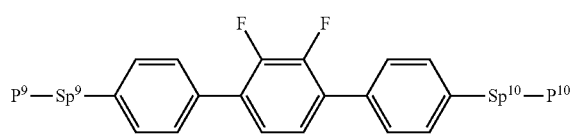
(2-21-1) 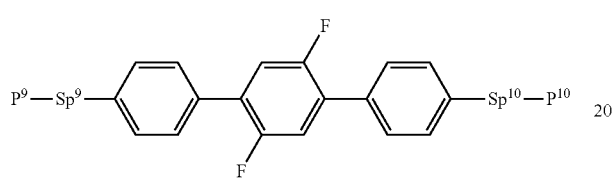
(2-22-1) 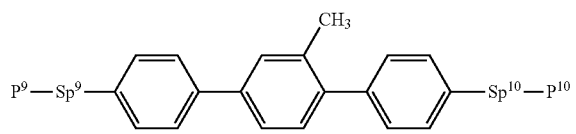
(3-1-1) 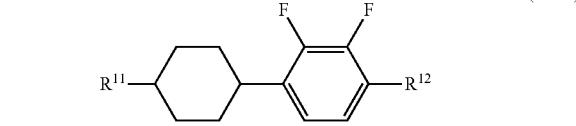
(3-2-1) 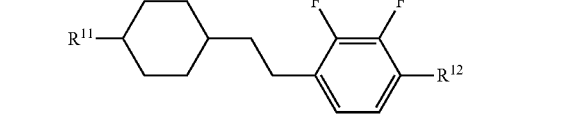
(3-3-1) 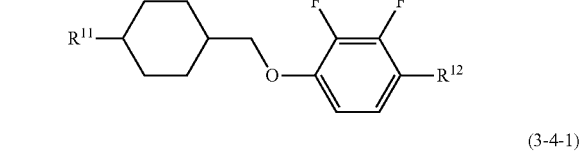
(3-4-1) 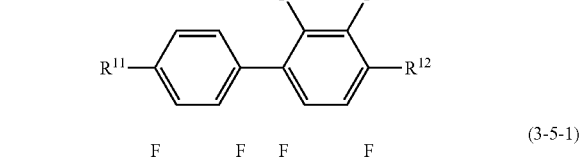
(3-5-1) 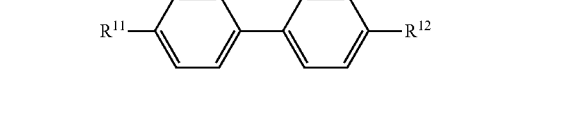
(3-6-1) 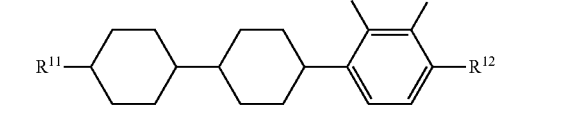
(3-7-1) 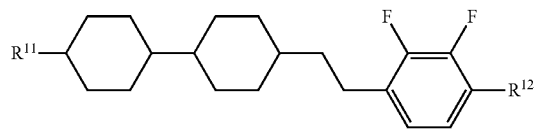
(3-8-1) 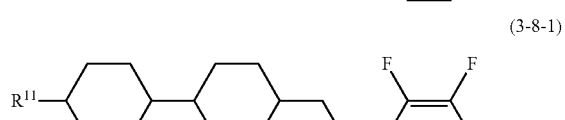
(3-9-1) 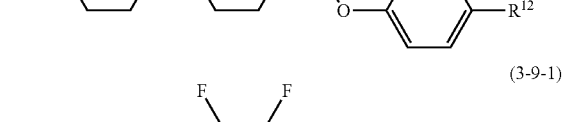
(3-10-1) 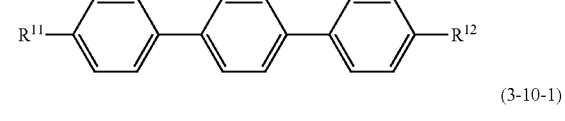
(3-11-1) 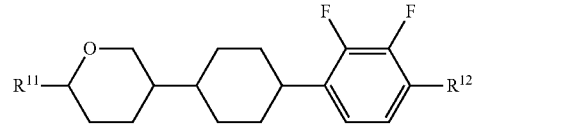
(3-12-1) 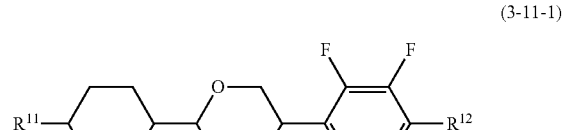
(3-13-1) 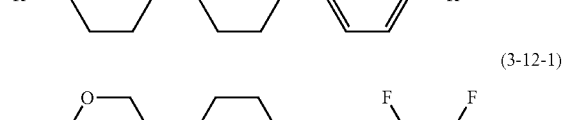
(3-14-1) 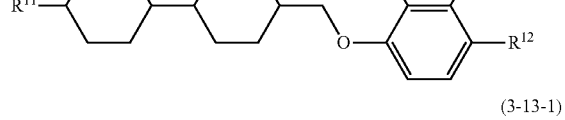
(3-15-1) 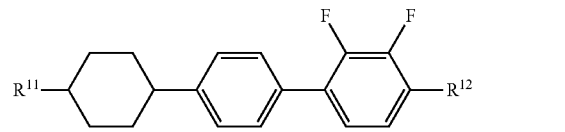
(3-16-1) 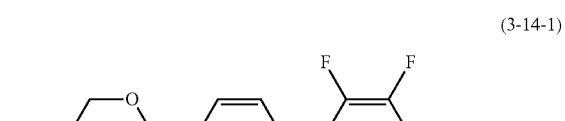

Sixth, additives which may be mixed with the composition will be explained. Such additives include an optically active compound, an antioxidant, an ultraviolet light absorber, a coloring matter, an antifoaming agent, a polymerization initiator and a polymerization inhibitor. The optically active compound is mixed with the composition for the purpose of inducing a helical structure and giving a twist angle in liquid crystals. Examples of such compounds include compound (5-1) to compound (5-5). A desirable ratio of the optically active compound is approximately 5% by weight or less, and a more desirable ratio is in the range of approximately 0.01% by weight to approximately 2% by weight.

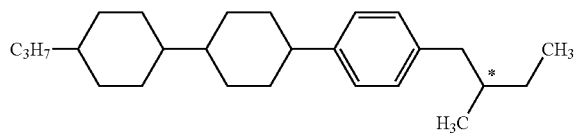

(5-3)

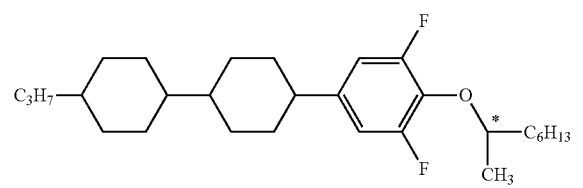

(5-4)

(5-5)

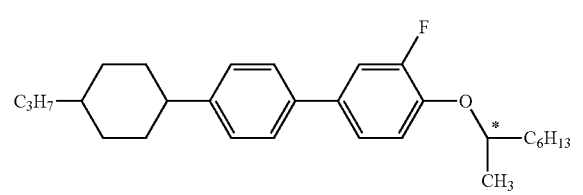

An antioxidant is mixed with the composition in order to prevent a decrease in specific resistance that is caused by heating under air, or to maintain a large voltage holding ratio at room temperature and also at a temperature close to the maximum temperature of a nematic phase after the device has been used for a long time.

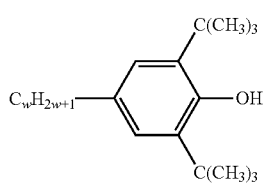

(6)

Desirable examples of the antioxidant include compound (6) where w is an integer from 1 to 9. In compound (6), desirable w is 1, 3, 5, 7 or 9. More desirable w is 1 or 7. Compound (6) where w is 1 is effective in preventing a decrease in specific resistance that is caused by heating under air, because it has a large volatility. Compound (6) where w is 7 is effective in maintaining a large voltage holding ratio at room temperature and also at a temperature close to the maximum temperature of a nematic phase even after the device has been used for a long time, because it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include a benzophenone derivative, a benzoate derivative and a triazole derivative. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is mixed with the composition for adjusting to a device having a guest host (GH) mode. A desirable ratio of the coloring matter is in the range of approximately 0.01% by weight to approximately 10% by weight.

An antifoaming agent such as dimethyl silicone oil or methyl phenyl silicone oil is mixed with the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

The liquid crystal composition of the invention is suitable for a device having PSA (polymer sustained alignment) mode, since it includes a polymerizable compound. The composition may further include a polymerizable compound excluding compound (1) and compound (2). Desirable examples of the polymerizable compound include compounds having a polymerizable group, such as acrylates, methacrylates, vinyl compounds, vinyloxy compounds, propenyl ethers, epoxy compounds (oxiranes, oxetanes) and vinyl ketones. Especially desirable examples of the polymerizable compound are acrylate derivatives or methacrylate derivatives. A desirable ratio of the polymerizable compound is approximately 0.03 part by weight or more for achieving its effect, and approximately 10 parts by weight or less for avoiding a poor display, when the weight of the liquid crystal composition is defined as 100 parts by weight. A more desirable ratio is in the range of approximately 0.1 part by weight to approximately 2 parts by weight. In the polymerizable compounds, a desirable ratio of compound (1) and compound (2) in total is approximately 10% by weight or more. A more desirable ratio is approximately 30% by weight or more. The polymerizable compound is polymerized on irradiation with ultraviolet light or the like, preferably in the presence of a suitable initiator such as a photopolymerization initiator. Suitable conditions for polymerization, and a suitable type and amount of the initiator are known to a person skilled in the art and are described in the literature. For example, Irgacure 651 (registered trademark; BASF), Irgacure 184 (registered trademark; BASF) or Darocure 1173 (registered trademark; BASF), each of which is a photoinitiator, is suitable for radical polymerization. A desirable ratio of the photopolymerization initiator is in the range of approximately 0.1% by weight to approximately 5% by weight of the polymerizable compounds. A more desirable ratio is in the range of approximately 1% by weight to approximately 3% by weight. There may be a procedure that a liquid crystal composition including a polymerizable compound is arranged between two substrates in a liquid crystal display device, and the polymerizable compound is polymerized while a voltage is applied between opposing electrode layers of these substrates or that a liquid crystal composition including a compound that has been polymerized in advance is arranged between two substrates in a liquid crystal display device.

Seventh, methods for synthesizing the component compounds will be explained. The component compounds can be prepared by a suitable combination of known methods in synthetic organic chemistry, those of which are described in Organic Syntheses (John Wiley & Sons, Inc.), Organic Reactions (John Wiley & Sons, Inc.), Comprehensive Organic Synthesis (Pergamon Press), Shin Jikken Kagaku Kouza (New Experimental Chemistry Course, in English; Maruzen Co., Ltd.) and so forth.

These compounds can be synthesized by known methods. The synthetic methods will be exemplified. Compound (3-1-1) and compound (3-6-1) are prepared by the method described in JP H02-503441 A (1990). Compound (4-1-1) and compound (4-5-1) are prepared by the method described in JP S59-176221 A (1984). An antioxidant is commercially available. The compound with formula (6) where w is 1 is available from Sigma-Aldrich Corporation. Compound (6) where w is 7 and so forth is synthesized according to the method described in U.S. Pat. No. 3,660,505.

Compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), Shin Jikken Kagaku Kouza (New experimental Chemistry Course, in English; Maruzen Co., Ltd.). The composition is prepared according to known methods using the compounds thus obtained. For example, the component compounds are mixed and dissolved in each other by heating.

Last, use of the composition will be explained. Most of the composition has a minimum temperature of approximately −10° C. or lower, a maximum temperature of approximately 70° C. or higher, and an optical anisotropy in the range of approximately 0.07 to approximately 0.20. A device containing the composition has a large voltage holding ratio. The composition is suitable for an AM device. The composition is suitable especially for an AM device having a transmission type. The composition having an optical anisotropy in the range of approximately 0.08 to approximately 0.25 may be prepared by adjusting ratios of the component compounds or by mixing with any other liquid crystal compound. The composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, VA, PSA or FPA. It is especially desirable to use the composition for the AM device having the PSA mode. These devices may be of a reflection type, a transmission type or a semi-transmission type. It is desirable to use the composition for a device having the transmission type. It can be used for an amorphous silicon-TFT device or a polycrystal silicon-TFT device. The composition is also usable for an NCAP (nematic curvilinear aligned phase) type device prepared by microcapsulating the composition, and for a PD (polymer dispersed) type device in which a three-dimensional network-polymer is formed in the composition.

The liquid crystal display device of the invention is characterized that the device is composed of two substrates in which at least one of them has an electrode layer, and the liquid crystal composition of the invention or the liquid crystal composition including the polymer of the compound of the invention is arranged between the two substrates. For example, the display device has two glass plates that are referred to as an array substrate and a color filter substrate, where a thin-film transistor (TFT), a pixel, a colored layer and so forth are formed on each of the glass substrates. For example, aluminosilicate glass or alumino-borosilicate glass is used as a glass substrate. Indium-tin oxide or indium-zinc oxide is generally used for the transparent electrode.

EXAMPLES

The invention will be explained below in more detail based on examples. The invention is not limited by these examples.

Compounds obtained by syntheses were identified by means of proton magnetic resonance spectroscopy ($^1$H-NMR) and so forth. The melting points of compounds were determined by differential scanning calorimetry (DSC). First, analytical methods will be explained.

$^1$H-NMR Analysis:

A model DRX-500 apparatus made by Bruker BioSpin Corporation was used for measurement. Samples prepared in Examples or the like was dissolved in a deuterated solvent in which the sample was soluble such as $CDCl_3$ and measured under the conditions of room temperature, 500 MHz and the accumulation of 24 scans. Incidentally, in the explanation of the resulting NMR spectra, the symbols s, d, t, q and m stand for a singlet, a doublet, a triplet, a quartet, and a multiplet, respectively. Tetramethylsilane was used as a standard material for a zero point of a chemical shift (δ value).

HPLC Analysis:

Model Prominence (LC-20AD; SPD-20A) apparatus made by Shimadzu Corporation was used for measurement. A column YMC-Pack ODS-A (length 150 mm, bore 4.6 mm, particle size 5 micrometers) made by YMC Co., Ltd. was used. A acetonitrile/water mixture (80/20 by volume) was used as an eluent, and the flow rate was adjusted to 1 mL/minute. A UV detector, a RI detector, a Corona detector and so forth were suitably used as a detector. A wavelength for detection was 254 nm when the UV detector was used. A sample was dissolved in acetonitrile in order to give a 0.1% by weight solution, and 1 microliter of the resulting solution was injected into the sample injector. Model C-R7Aplus made by Shimadzu Corporation was used as a recorder. The resulting chromatogram showed the retention time of peaks and the peak areas corresponding to the component compounds.

The ratio of the peak areas in the chromatogram of the HPLC corresponds to the ratio of component compounds. In general, the percentage by weight of each component compound in an analytical sample is not completely the same as the percentage of each peak area in the analytical sample. In the invention, however, the percentage by weight of the component compound in the analytical sample corresponds substantially to the percentage of the peak area in the analytical sample, because the correction coefficient is essentially 1 (one) when the column described above is used. This is because there is no significant difference among the correction coefficients of the liquid crystal compounds as components.

UV/Vis Analysis:

Model PharmaSpec UV-1700 apparatus made by Shimadzu Corporation was used for measurement. Wavelengths in the range of 190 nm to 700 nm were used for detection. A sample was dissolved in acetonitrile, giving a 0.01 mmol/L solution, which was placed in a quartz cell (optical path length: 1 cm) and measured.

DSC Measurement:

A Perkin-Elmer differential scanning calorimeter, a DSC-7 System or a Diamond DSC System, was used for measurement. A sample was heated and then cooled at the rate of 3° C. per minute. The starting point of an endothermic peak or an exothermic peak caused by a phase change of the sample was obtained by means of the extrapolation, and the melting point was determined.

A composition and a compound were a subject for measurement in order to evaluate characteristics of the composition and the compound to be included in the composition. When the subject for measurement was a composition, the composition itself was measured as a sample, and the value obtained was described here. When a subject for measurement was a compound, a sample for measurement was prepared by mixing 15% by weight of the compound and 85% by weight of mother liquid crystals. The characteristic values of the compound were calculated from values obtained by measurement, according to a method of extrapolation. That is: (extrapolated value)=[(measured value of a sample for measurement)−0.85×(measured value of mother liquid crystals)]/0.15. When a smectic phase (or crystals) separated out in this ratio at 25° C., the ratio of the compound to the mother liquid crystals was changed step by step in the order of (10% by weight/90% by weight), (5% by weight/95% by weight) and (1% by weight/99% by weight). The values of the maximum temperature, the optical anisotropy, the viscosity and the dielectric anisotropy with regard to the compound were obtained by this extrapolation method.

The components and their ratio of mother liquid crystals were as follows.

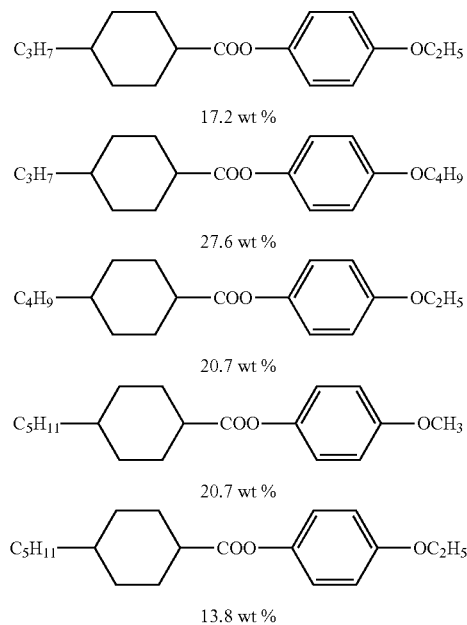

Characteristics were measured according to the following methods. Most are methods described in the JEITA standards (JEITA-ED-2521B) which was deliberated and established by Japan Electronics and Information Technology Industries Association (abbreviated to JEITA), or the modified methods.

Maximum Temperature of a Nematic Phase (NI; ° C.):

A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

Minimum Temperature of a Nematic Phase (Tc; ° C.):

A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as ≤−20° C. A lower limit of the temperature range of a nematic phase may be abbreviated to "the minimum temperature."

Viscosity (bulk viscosity; η; measured at 20° C.; mPa·s):

An E-type viscometer was used for measurement.

Optical Anisotropy (Refractive Index Anisotropy; Δn; Measured at 25° C.):

An Abbe refractometer in which the ocular was equipped with a polarizing plate was used for measurement using light at a wavelength of 589 nanometers. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: Δn=n∥−n⊥.

Dielectric Anisotropy (Δ∈; Measured at 25° C.):

The value of dielectric anisotropy was calculated from the equation: Δ∈=∈∥−∈⊥. Dielectric constants (∈∥ and ∈⊥) were measured as follows.

1) Measurement of a dielectric constant (∈∥): A solution of octadecyltriethoxysilane (0.16 mL) in ethanol (20 mL) was applied to a thoroughly cleaned glass substrate. The glass substrate was rotated with a spinner, and then heated at 150° C. for one hour. A sample was poured into a VA device in which the distance between the two glass substrates (cell gap) was 4 micrometers, and then the device was sealed with an adhesive curable with ultraviolet light. Sine waves (0.5 V, 1 kHz) were applied to the device, and a dielectric constant (∈∥) in the major axis direction of liquid crystal molecules was measured after 2 seconds.

2) Measurement of a dielectric constant (∈⊥): A polyimide solution was applied to a thoroughly cleaned glass substrate. The glass substrate was burned, and then the resulting alignment film was subjected to rubbing. A sample was poured into a TN device in which the distance between the two glass substrates (cell gap) was 9 micrometers and the twist angle was 80 degrees. Sine waves (0.5 V, 1 kHz) were applied to the device, and a dielectric constant (∈⊥) in the minor axis direction of liquid crystal molecules was measured after 2 seconds.

Threshold Voltage (Vth; Measured at 25° C.; V):

An LCD evaluation system Model LCD-5100 made by Otsuka Electronics Co., Ltd. was used for measurement. The light source was a halogen lamp. A sample was poured into a VA device having a normally black mode, in which the distance between the two glass substrates (cell gap) was 4 micrometers and the rubbing direction was antiparallel, and then the device was sealed with an adhesive curable with ultraviolet light. Voltages applied to the device (60 Hz, rectangular waves) were increased stepwise from 0 volts to 20 volts in 0.02 volt increments. The device was simultaneously irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 10% transmittance.

Voltage Holding Ratio (VHR-1; Measured at 25° C.; %):

A TN device used for measurement had a polyimide-alignment film, and the distance between the two glass substrates (cell gap) was 5 micrometers. A sample was poured into the device, and then the device was sealed with an adhesive curable with ultraviolet light. A pulse voltage (60 microseconds at 5 V) was applied to the TN device and the device was charged. A decreasing voltage was measured for 16.7 milliseconds with a high-speed voltmeter, and area A between the voltage curve and the horizontal axis in a unit cycle was obtained. Area B was an area without the decrease. The voltage holding ratio was the percentage of area A to area B.

Voltage Holding Ratio (VHR-2; Measured at 80° C.; %):

A TN device used for measurement had a polyimide-alignment film, and the distance between the two glass substrates (cell gap) was 5 micrometers. A sample was poured into the device, and then the device was sealed with an adhesive curable with ultraviolet light. A pulse voltage (60 microseconds at 5 V) was applied to the TN device and the device was charged. A decreasing voltage was measured for 16.7 milliseconds with a high-speed voltmeter and area A between the voltage curve and the horizontal axis in a unit cycle was obtained. Area B was an area without the decrease. The voltage holding ratio was a percentage of area A to area B.

Voltage Holding Ratio (VHR-3; Measured at 25° C.; %):

The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

Voltage Holding Ratio (VHR-4; Measured at 25° C.; %):

A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

Response Time ($\tau$; Measured at 25° C.; Millisecond):

An LCD evaluation system Model LCD-5100 made by Otsuka Electronics Co., Ltd. was used for measurement. The light source was a halogen lamp. The low-pass filter was set at 5 kHz. A sample was poured into a PVA device having a normally black mode, in which the cell gap between the two glass substrates was 3.2 micrometers and the rubbing direction was antiparallel, and the device was sealed with an adhesive curable with ultraviolet light. The device was irradiated with ultraviolet light of 25 mW/cm$^2$ for 400 seconds while a voltage of 15 volts was applied. A mercury-xenon lamp, Model Execure 4000-D, made by Hoya Candeo Optronics Corp. was used for ultraviolet irradiation. Rectangular waves (60 Hz, 10 V, 0.5 second) were applied to the device. The device was simultaneously irradiated with light in the perpendicular direction, and the amount of light passing through the device was measured. The maximum amount of light corresponded to 100% transmittance, and the minimum amount of light corresponded to 0% transmittance. The response time was the period of time required for the change from 0% to 90% transmittance (rise time; millisecond).

Specific Resistance ($\rho$; Measured at 25° C.; $\Omega$ cm):

A sample (1.0 mL) was poured into a vessel equipped with electrodes. A DC voltage (10 V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

GC Analysis:

A Gas Chromatograph Model GC-14B made by Shimadzu Corporation was used for measurement. Helium was used as a carrier gas (2 mL/minute). The temperature of the sample injector was set at 280° C. and the temperature of the detector (FID) was set at 300° C. A capillary column DB-1 (length 30 m, bore 0.32 mm, film thickness 0.25 micrometer; dimethylpolysiloxane as a stationary liquid phase; non-polar) made by Agilent Technologies Inc. was used for the separation of component compounds. After the column had been kept at 200° C. for 2 minutes, it was further heated to 280° C. at the rate of 5° C. per minute. A sample was dissolved in acetone, and 1 microliter of the solution (0.1% by weight) was injected into the sample injector. A recorder used was a Model C-R5A Chromatopac Integrator made by Shimadzu Corporation or its equivalent. The resulting gas chromatogram showed the retention time of peaks and the peak areas corresponding to the component compounds.

Chloroform or hexane, for example, may also be used as a solvent for diluting the sample. The following capillary columns may also be used for the separation of component compounds: HP-1 (length 30 m, bore 0.32 mm, film thickness 0.25 micrometer) made by Agilent Technologies Inc., Rtx-1 (length 30 m, bore 0.32 mm, film thickness 0.25 micrometer) made by Restek Corporation, BP-1 (length 30 m, bore 0.32 mm, film thickness 0.25 micrometer) made by SGE International Pty. Ltd, and so forth. A capillary column CBP1-M50-025 (length 50 m, bore 0.25 mm, film thickness 0.25 micrometer) made by Shimadzu Corporation may be used in order to avoid an overlap of compound peaks.

The ratio of the liquid crystal compounds included in the composition may be calculated according to the following method. The liquid crystal compounds are detected by use of a gas chromatograph. The ratio of peak areas in the gas chromatogram corresponds to the ratio (molar ratio) of the liquid crystal compounds. When the capillary columns described above are used, the correction coefficient of respective liquid crystal compounds may be regarded as 1 (one). Accordingly, the ratio (percentage by weight) of the liquid crystal compounds can be calculated from the ratio of peak areas.

The compounds described in Comparative Examples and Examples were expressed as symbols according to the definition in Table 3 below. In Table 3, the configuration of 1,4-cyclohexylene is trans. A parenthesized number next to the symbol in Example corresponds to the number of the compound. The symbol (-) means any other liquid crystal compound. The ratios (percentage) of liquid crystal compounds mean the percentages by weight (% by weight) based on the weight of the liquid crystal composition excluding the first and second components. The liquid crystal composition further includes an impurity. Last, the values of characteristics of the composition were summarized.

TABLE 3

Method of Description of Compounds using Symbols
R—(A$_1$)—Z$_1$—·····—Z$_n$—(A$_n$)—R'

| 1) Left-terminal Group R— | Symbol |
|---|---|
| C$_n$H$_{2n+1}$— | n- |
| C$_n$H$_{2n+1}$O— | nO- |
| C$_m$H$_{2m+1}$OC$_n$H$_{2n}$— | mOn- |
| CH$_2$=CH— | V- |
| C$_n$H$_{2n+1}$—CH=CH— | nV- |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF- |
| CF$_2$=CH—C$_n$H$_{2n}$— | VFFn- |
| CH$_2$=CH—COO— | AC- |
| CH$_2$=C(CH$_3$)—COO— | MAC- |

TABLE 3-continued

Method of Description of Compounds using Symbols
R—(A₁)—Z₁—·····—Zₙ—(Aₙ)—R'

2) Right-terminal Group —R' | Symbol
--- | ---
—CₙH₂ₙ₊₁ | -n
—OCₙH₂ₙ₊₁ | -On
—CH=CH₂ | -V
—CH=CH—CₙH₂ₙ₊₁ | -Vn
—CₙH₂ₙ—CH=CH₂ | -nV
—CₘH₂ₘ—CH=CH—CₙH₂ₙ₊₁ | -mVn
—CH=CF₂ | -VFF
—OCO—CH=CH₂ | -AC
—OCO—C(CH₃)=CH₂ | -MAC 3) Bonding Group —Zₙ— | Symbol
--- | ---
—CₙH₂ₙ— | n
—COO— | E
—CH=CH— | V
—CH=CHO— | VO
—OCH=CH— | OV
—CH₂O— | 1O
—OCH₂— | O1

4) Ring Structure —Aₙ— | Symbol
--- | ---
 | H
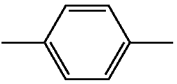 | B
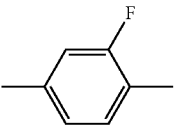 | B(F)
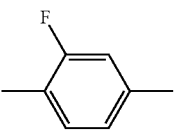 | B(2F)
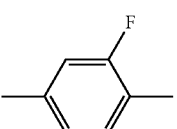 | B(F,F)
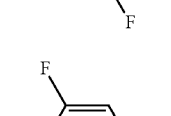 | B(2F,5F)
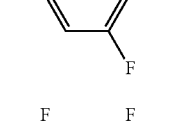 | B(2F,3F)
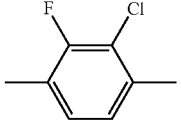 | B(2F,3CL)
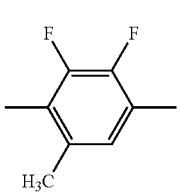 | B(2F,3F,6Me)
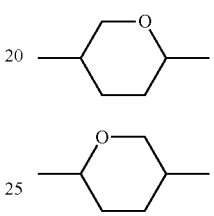 | dh
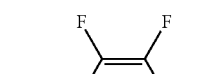 | Dh
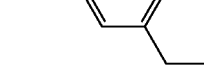 | Cro(7F,8F)

5) Examples of Description

Example 1. V-HHB(2F,3F)-O2

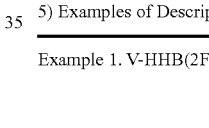

Example 2. AC-VO-BB-AC

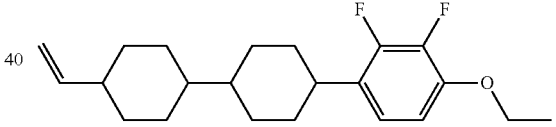

Example 3. V-HHB-1

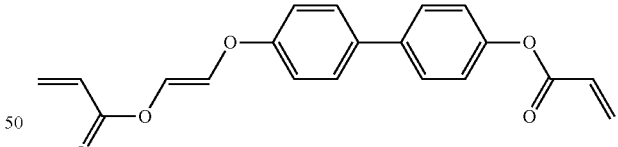

Example 4. 3-DhHB(2F,3F)-O2

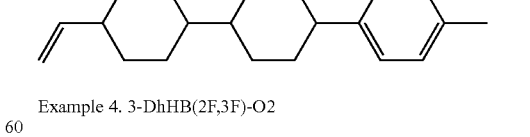

Example 1

Three samples were prepared by the addition of 0.30 part by weight in total of a polymerizable compound that was the first component and a polymerizable compound that was the second component to 100 parts by weight of liquid crystal composition A, and three liquid crystal display devices were prepared. The components of liquid crystal composition A, their ratios and the preparation method for the device were described below. Table 4 shows polymerizable compounds used for the preparation of the device and their parts by weight.

Liquid Crystal Composition A

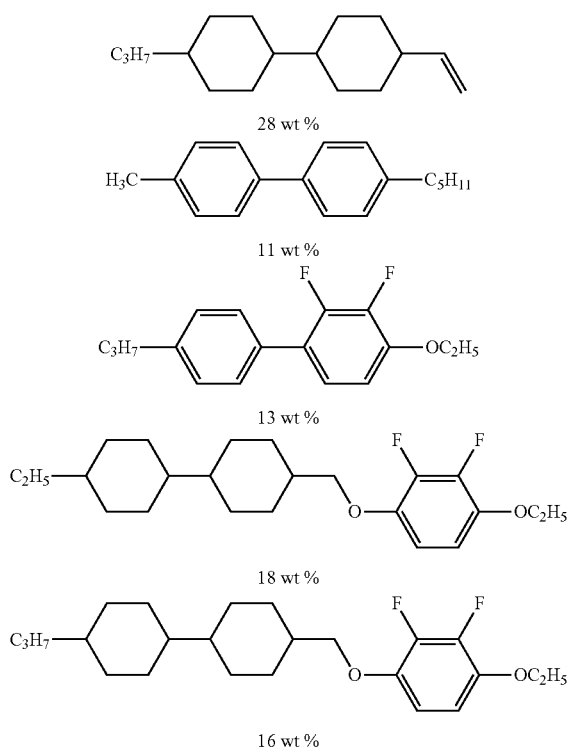

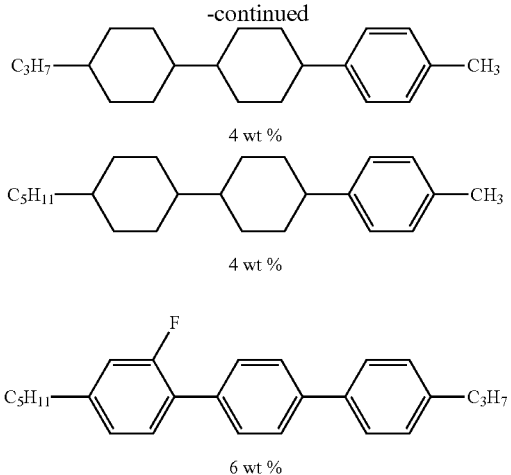

Method for Preparation of a Liquid Crystal Display Device

An aligning agent was applied to two glass substrates equipped with ITO electrodes using of a spinner, and a film was formed. After application, the substrates were dried at 80° C. for approximately 10 minutes, and then treated at 180° C. for 60 minutes, forming an alignment film. An LCD spacer was disseminated to one of the glass substrates and an epoxy-adhesive was placed at the periphery of the other substrate, excluding an inlet for liquid crystals. The substrates were pasted together with the alignment films inside. A sample was injected to the device in a vacuum, the inlet was sealed with a photocurable adhesive, and the photocurable adhesive was cured with ultraviolet irradiation. A liquid crystal display device was prepared after heat treatment at 110° C. for 30 minutes. The device was irradiated with ultraviolet light of 25 mW/cm$^2$ for 400 second using a mercury-xenon lamp, Model EXECURE 4000-D, made by Hoya Candeo Optronics Corp., while a voltage of 15 volts was applied, and a liquid crystal display device was finally prepared.

TABLE 4

Comparison of response time on a polymerizable compound (Example 1)

| | Formula | Chemical structure | Parts by weight | Response time (ms) |
|---|---|---|---|---|
| Example 1-1 | (1-1-1) | | 0.27 | 4.7 |
| | (2-2-1) | | 0.03 | |

TABLE 4-continued

Comparison of response time on a polymerizable compound (Example 1)

| | Formula | Chemical structure | Parts by weight | Response time (ms) |
|---|---|---|---|---|
| Example 1-2 | (1-1-1) | | 0.21 | 4.3 |
| | (2-2-1) | | 0.09 | |
| Example 1-3 | (1-1-1) | | 0.15 | 4.8 |
| | (2-2-1) | | 0.15 | |

Comparative example 1

A sample in which 0.30 part by weight of a polymerizable compound that was the first component was added to 100 parts by weight of liquid crystal composition A was prepared. A sample in which 0.30 part by weight of a polymerizable compound that was the second component was added was prepared. A sample in which no polymerizable compounds were added was prepared. Three liquid crystal display devices were prepared in the same manner as described in Example 1. Table 5 shows the polymerizable compounds that were used for the preparation of the devices and their parts by weight.

TABLE 5

Comparison of response time on a polymerizable compound (Comparative example 1)

| | Formula | Chemical structure | Parts by weight | Response time (ms) |
|---|---|---|---|---|
| Comparative example 1-1 | (1-1-1) | | 0.30 | 5.5 |
| Comparative example 1-2 | (2-2-1) | | 0.30 | 5.6 |
| Comparative example 1-3 | No polymerizable compounds | — | — | 6.4 |

It was found from Table 4 and Table 5 that a short response time was achieved in the case of the addition of compound (1-1-1) and compound (2-2-1) as polymerizable compounds in comparison with the case of the addition of compound (1-1-1) only or compound (2-2-1) only. The response time was the shortest when the weight ratio of compound (1-1-1) to compound (2-2-1) was 7:3.

Example 2

| 3-BB(2F,3F)-O2 | (3-4-1) | 10% |
| 5-BB(2F,3F)-O2 | (3-4-1) | 10% |
| 2-HH1OB(2F,3F)-O2 | (3-8-1) | 8% |
| 3-HH1OB(2F,3F)-O2 | (3-8-1) | 12% |
| 3-HDhB(2F,3F)-O2 | (3-11-1) | 6% |
| 5-DhH1OB(2F,3F)-O2 | (3-12-1) | 3% |
| 3-dhBB(2F,3F)-O2 | (3-14-1) | 5% |
| 3-HEB(2F,3F)B(2F,3F)-O4 | (3-15-1) | 4% |
| 3-HH-V | (4-1-1) | 24% |
| 1-BB-3 | (4-3-1) | 5% |
| 3-HHB-1 | (4-5-1) | 3% |
| 3-HHB-3 | (4-5-1) | 3% |
| V-HHB-1 | (4-5-1) | 3% |
| 5-B(F)BB-2 | (4-7-1) | 4% |

0.2 Part by weight of compound (1-1-1) that was the first component of the invention and 0.1 part by weight of compound (2-1-1) that was the second component of the invention were added to 100 parts by weight of the preceding composition.

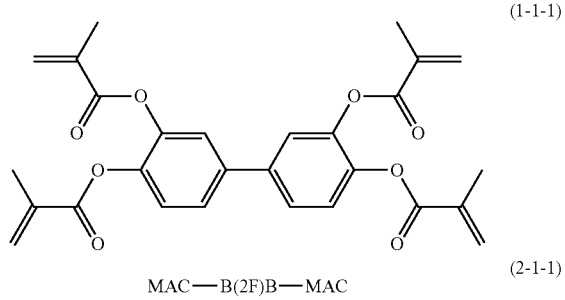

(1-1-1)

MAC—B(2F)B—MAC (2-1-1)

The characteristics of the resulting composition were as follows: NI=78.9° C.; Tc<−20° C.; Δn=0.114; Δ∈=−3.8; Vth=2.07 V; VHR-1=99.3%; VHR-2=98.2%. The response time (τ) of the liquid crystal display device prepared by the method described in Example 1 was 5.0 ms.

Example 3

| 3-H2B(2F,3F)-O2 | (3-2-1) | 17% |
| 5-H2B(2F,3F)-O2 | (3-2-1) | 15% |
| 5-HH2B(2F,3F)-O2 | (3-7-1) | 5% |
| 3-HBB(2F,3F)-O2 | (3-13-1) | 10% |
| 4-HBB(2F,3F)-O2 | (3-13-1) | 4% |
| 3-HHB(2F,3Cl)-O2 | (3-16-1) | 3% |
| 3-HBB(2F,3Cl)-O2 | (3-17-1) | 3% |
| 2-HH-3 | (4-1-1) | 27% |
| 3-HHEH-3 | (4-4-1) | 3% |
| 3-HHB-O1 | (4-5-1) | 4% |
| 3-HBB-2 | (4-6-1) | 3% |
| 3-HB(F)HH-5 | (4-10-1) | 3% |
| 5-HBBH-3 | (4-11-1) | 3% |

0.15 Part by weight of compound (1-1-1) that was the first component of the invention and 0.15 part by weight of compound (2-2-1) that was the second component of the invention were added to 100 parts by weight of the preceding composition.

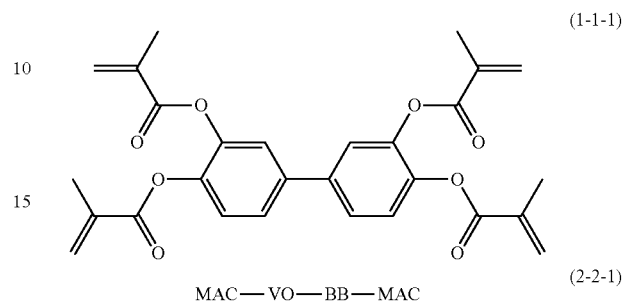

(1-1-1)

MAC—VO—BB—MAC (2-2-1)

The characteristics of the resulting composition were as follows: NI=81.3° C.; Tc<−20° C.; Δn=0.089; Δ∈=−2.7; Vth=2.40 V; VHR-1=99.1%; VHR-2=97.7%. The response time (τ) of the liquid crystal display device prepared by the method described in Example 1 was 5.3 ms.

Example 4

| 3-H2B(2F,3F)-O2 | (3-2-1) | 17% |
| 5-H2B(2F,3F)-O2 | (3-2-1) | 16% |
| 2-BB(2F,3F)B-3 | (3-9-1) | 6% |
| 3-DhHB(2F,3F)-O2 | (3-10-1) | 4% |
| 3-HBB(2F,3F)-O2 | (3-13-1) | 9% |
| 4-HBB(2F,3F)-O2 | (3-13-1) | 5% |
| 5-HBB(2F,3F)-O2 | (3-13-1) | 5% |
| 3-H1OCro(7F,8F)-5 | (3-18-1) | 3% |
| 3-HH1OCro(7F,8F)-5 | (3-19-1) | 3% |
| 3-HH-V | (4-1-1) | 20% |
| 3-HH-V1 | (4-1-1) | 3% |
| 3-HHB-O1 | (4-5-1) | 3% |
| 3-HB(F)BH-3 | (4-12-1) | 3% |
| 5-HBB(F)B-2 | (4-13-1) | 3% |

0.15 Part by weight of compound (1-1-1) that was the first component of the invention and 0.15 part by weight of compound (2-18-1) that was the second component of the invention were added to 100 parts by weight of the preceding composition.

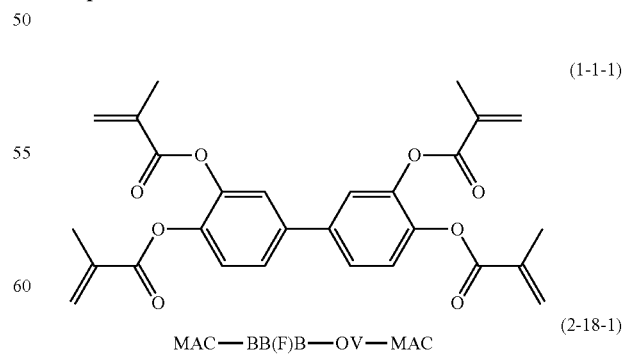

(1-1-1)

MAC—BB(F)B—OV—MAC (2-18-1)

The characteristics of the resulting composition were as follows: NI=77.4° C.; Tc<−20° C.; Δn=0.110; Δ∈=−3.7; Vth=2.09 V; VHR-1=99.3%; VHR-2=98.1%. The response time (τ) of the liquid crystal display device prepared by the method described in Example 1 was 5.0 ms.

Example 5

| | | |
|---|---|---|
| 3-H2B(2F,3F)-O2 | (3-2-1) | 18% |
| 5-H2B(2F,3F)-O2 | (3-2-1) | 15% |
| 2-BB(2F,3F)B-3 | (3-9-1) | 6% |
| 3-DhHB(2F,3F)-O2 | (3-10-1) | 4% |
| 3-HBB(2F,3F)-O2 | (3-13-1) | 9% |
| 4-HBB(2F,3F)-O2 | (3-13-1) | 5% |
| 5-HBB(2F,3F)-O2 | (3-13-1) | 5% |
| 3-H1OCro(7F,8F)-5 | (3-18-1) | 3% |
| 3-HH1OCro(7F,8F)-5 | (3-19-1) | 3% |
| 3-HH-V | (4-1-1) | 19% |
| 3-HH-V1 | (4-1-1) | 4% |
| 3-HHB-O1 | (4-5-1) | 3% |
| 3-HB(F)BH-3 | (4-12-1) | 3% |
| 5-HBB(F)B-2 | (4-13-1) | 3% |

0.15 Part by weight of compound (1-2-1) that was the first component of the invention and 0.15 part by weight of compound (2-18-1) that was the second component of the invention were added to 100 parts by weight of the preceding composition.

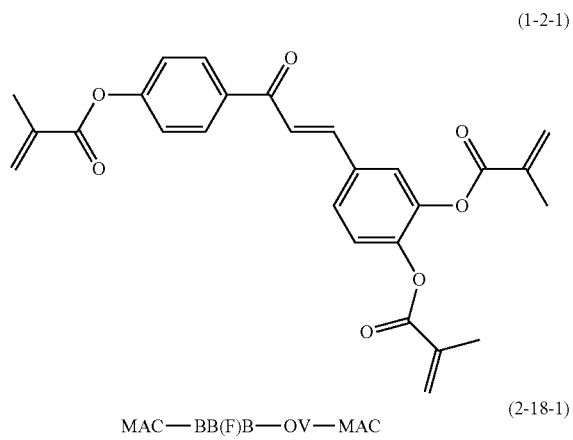

(1-2-1)

MAC—BB(F)B—OV—MAC (2-18-1)

The characteristics of the resulting composition were as follows: NI=76.7° C.; Tc<−20° C.; Δn=0.109; Δ∈=−3.7; Vth=2.08 V; VHR-1=99.3%; VHR-2=98.0%. The response time (τ) of the liquid crystal display device prepared by the method described in Example 1 was 5.4 ms.

Example 6

| | | |
|---|---|---|
| 3-H2B(2F,3F)-O2 | (3-2-1) | 20% |
| 1V2-H2B(2F,3F)-O2 | (3-2-1) | 10% |
| 3-HHB(2F,3F)-O2 | (3-6-1) | 8% |
| 3-HHB(2F,3F)-1 | (3-6-1) | 5% |
| 1V2-HH2B(2F,3F)-O2 | (3-7-1) | 3% |
| 3-HDhB(2F,3F)-O2 | (3-11-1) | 5% |
| 3-HBB(2F,3F)-O2 | (3-13-1) | 10% |
| 4-HBB(2F,3F)-O2 | (3-13-1) | 6% |
| 5-HBB(2F,3F)-O2 | (3-13-1) | 3% |
| 2-HH-3 | (4-1-1) | 15% |
| 3-HH-4 | (4-1-1) | 6% |
| 3-HH-V1 | (4-1-1) | 6% |
| V2-HHB-1 | (4-5-1) | 3% |

0.28 Part by weight of compound (1-1-1) that was the first component of the invention and 0.12 part by weight of compound (2-3-1) that was the second component of the invention were added to 100 parts by weight of the preceding composition.

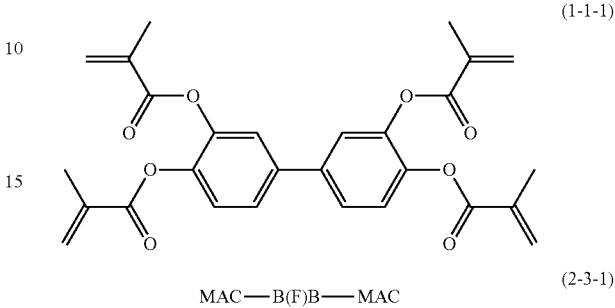

(1-1-1)

MAC—B(F)B—MAC (2-3-1)

The characteristics of the resulting composition were as follows: NI=81.4° C.; Tc<−20° C.; Δn=0.096; Δ∈=−3.8; Vth=2.14 V; VHR-1=99.4%; VHR-2=98.2%. The response time (τ) of the liquid crystal display device prepared by the method described in Example 1 was 5.1 ms.

Example 7

| | | |
|---|---|---|
| 3-BB(2F,3F)-O2 | (3-4-1) | 13% |
| 5-BB(2F,3F)-O2 | (3-4-1) | 3% |
| 2-HH1OB(2F,3F)-O2 | (3-8-1) | 20% |
| 3-HH1OB(2F,3F)-O2 | (3-8-1) | 13% |
| 3-HH-V | (4-1-1) | 29% |
| 3-HB-O2 | (4-2-1) | 4% |
| 1-BB-3 | (4-3-1) | 7% |
| 3-HHB-1 | (4-5-1) | 3% |
| 5-B(F)BB-2 | (4-7-1) | 4% |
| 3-HHEBH-3 | (4-9-1) | 4% |

0.2 Part by weight of compound (1-1-1) that was the first component of the invention and 0.1 part by weight of compound (2-2-1) that was the second component of the invention were added to 100 parts by weight of the preceding composition.

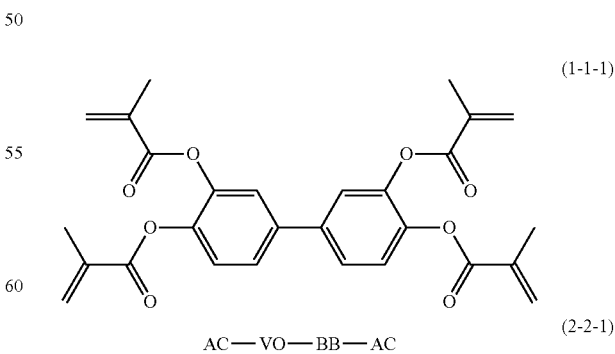

(1-1-1)

AC—VO—BB—AC (2-2-1)

The characteristics of the resulting composition were as follows: NI=74.8° C.; Tc<−20° C.; Δn=0.103; Δ∈=3.0; Vth=2.18 V; VHR-1=99.1%; VHR-2=97.9%. The response time (τ) of the liquid crystal display device prepared by the method described in Example 1 was 4.1 ms.

Example 8

| V-HB(2F,3F)-O2 | (3-1-1) | 12% |
| V-HB(2F,3F)-O4 | (3-1-1) | 12% |
| 1V2-HB(2F,3F)-O2 | (3-1-1) | 6% |
| 3-HBB(2F,3F)-O2 | (3-13-1) | 10% |
| 4-HBB(2F,3F)-O2 | (3-13-1) | 6% |
| 5-HBB(2F,3F)-O2 | (3-13-1) | 9% |
| 3-HH1OCro(7F,8F)-5 | (3-19-1) | 5% |
| 3-HH1OB(2F,3F,6Me)-O2 | (3) | 3% |
| 2-HH-3 | (4-1-1) | 18% |
| 3-HH-VFF | (4-1) | 6% |
| 3-HHB-1 | (4-5-1) | 3% |
| 3-HHB-O1 | (4-5-1) | 3% |
| 5-HBB(F)B-2 | (4-13-1) | 4% |
| 1O1-HBBH-5 | (—) | 3% |

0.21 Part by weight of compound (1-1-1) that was the first component of the invention and 0.09 part by weight of compound (2-2-1) that was the second component of the invention were added to 100 parts by weight of the preceding composition.

(1-1-1)

(2-2-1)

AC—VO—BB—AC

The characteristics of the resulting composition were as follows: NI=83.5° C.; Tc<−20° C.; Δn=0.103; Δε=−3.7; Vth=1.96 V; VHR-1=99.2%; VHR-2=97.9%. The response time (τ) of the liquid crystal display device prepared by the method described in Example 1 was 5.4 ms.

Example 9

| 3-BB(2F,3F)-O2 | (3-4-1) | 10% |
| 5-BB(2F,3F)-O2 | (3-4-1) | 3% |
| 2O-BB(2F,3F)-O2 | (3-4) | 4% |
| 3-B(2F,3F)B(2F,3F)-O2 | (3-5-1) | 3% |
| 2-HH1OB(2F,3F)-O2 | (3-8-1) | 19% |
| 3-HH1OB(2F,3F)-O2 | (3-8-1) | 6% |
| 2-HH-3 | (4-1-1) | 20% |
| 3-HH-4 | (4-1-1) | 9% |
| 4-HH-V | (4-1-1) | 3% |
| 3-HB-O2 | (4-2-1) | 3% |
| V2-BB-1 | (4-3-1) | 5% |
| 3-HHB-1 | (4-5-1) | 3% |
| 3-HHB-O1 | (4-5-1) | 3% |
| 1-BB(F)B-2V | (4-8-1) | 5% |
| 3-HHEBH-4 | (4-9-1) | 4% |

0.18 Part by weight of compound (1-5-1) that was the first component of the invention and 0.12 part by weight of compound (2-19-1) that was the second component of the invention were added to 100 parts by weight of the preceding composition.

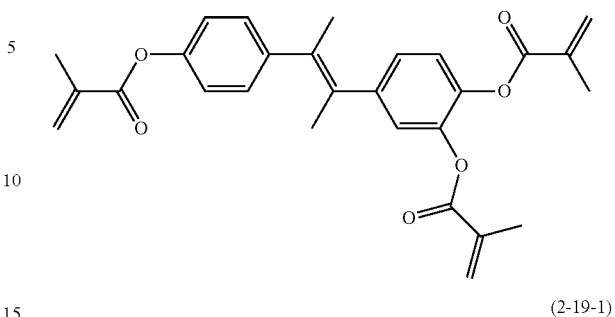

(1-5-1)

(2-19-1)

MAC—VO—BBB(F)—OV—MAC

The characteristics of the resulting composition were as follows: NI=77.5° C.; Tc<−20° C.; Δn=0.102; Δε=−2.9; Vth=2.21 V; VHR-1=99.1%; VHR-2=98.1%. The response time (τ) of the liquid crystal display device prepared by the method described in Example 1 was 4.5 ms.

Example 10

| 3-H1OB(2F,3F)-O2 | (3-3-1) | 5% |
| 3-BB(2F,3F)-O2 | (3-4-1) | 6% |
| 5-BB(2F,3F)-O2 | (3-4-1) | 6% |
| 2O-B(2F,3F)B(2F,3F)-O6 | (3-5) | 3% |
| V-HHB(2F,3F)-O2 | (3-6-1) | 7% |
| 2-HH1OB(2F,3F)-O2 | (3-8-1) | 8% |
| 3-HH1OB(2F,3F)-O2 | (3-8-1) | 10% |
| 2-HH-3 | (4-1-1) | 23% |
| 3-HH-4 | (4-1-1) | 5% |
| 3-HH-O1 | (4-1-1) | 3% |
| 7-HB-1 | (4-2-1) | 4% |
| V2-BB-1 | (4-3-1) | 5% |
| 3-HHB-1 | (4-5-1) | 3% |
| 3-HHB-O1 | (4-5-1) | 4% |
| 2-BB(F)B-3 | (4-8-1) | 4% |
| 3-HHEBH-4 | (4-9-1) | 4% |

0.2 Part by weight of compound (1-1-1) that was the first component of the invention and 0.1 part by weight of compound (2-2-1) that was the second component of the invention were added to 100 parts by weight of the preceding composition.

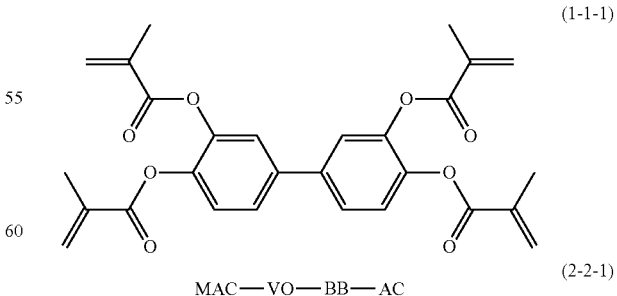

(1-1-1)

(2-2-1)

MAC—VO—BB—AC

The characteristics of the resulting composition were as follows: NI=75.2° C.; Tc<−20° C.; Δn=0.094; Δε=−3.0; Vth=2.25 V; VHR-1=99.2%; VHR-2=97.9%. The response time (τ) of the liquid crystal display device prepared by the method described in Example 1 was 3.9 ms.

Example 11

| | | |
|---|---|---|
| 3-HB(2F,3F)-O2 | (3-1-1) | 17% |
| 3-HB(2F,3F)-O4 | (3-1-1) | 15% |
| 3-HBB(2F,3F)-O2 | (3-13-1) | 10% |
| 4-HBB(2F,3F)-O2 | (3-13-1) | 6% |
| 5-HBB(2F,3F)-O2 | (3-13-1) | 6% |
| 3-HH1OCro(7F,8F)-5 | (3-19-1) | 5% |
| 3-HH2B(2F,3F,6Me)-O2 | (3) | 3% |
| 3-HH1OB(2F,3F,6Me)-O2 | (3) | 3% |
| 2-HH-3 | (4-1-1) | 23% |
| 3-HHB-1 | (4-5-1) | 3% |
| 3-HHB-O1 | (4-5-1) | 3% |
| 3-HHB-3 | (4-5-1) | 3% |
| 5-HBB(F)B-2 | (4-13-1) | 3% |

0.2 Part by weight of compound (1-1-1) that was the first component of the invention and 0.1 part by weight of compound (2-1-1) that was the second component of the invention were added to 100 parts by weight of the preceding composition.

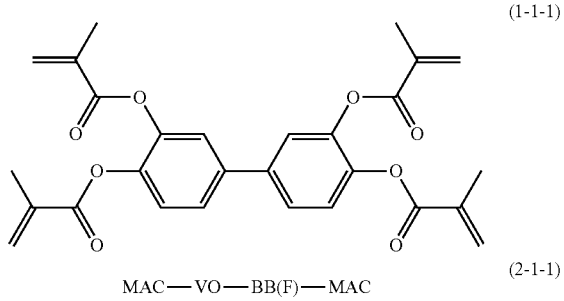

MAC—VO—BB(F)—MAC  (2-1-1)

The characteristics of the resulting composition were as follows: NI=79.7° C.; Tc<−20° C.; Δn=0.095; Δ∈=−3.8; Vth=1.92 V; VHR-1=99.3%; VHR-2=98.1%. The response time (τ) of the liquid crystal display device prepared by the method described in Example 1 was 5.3 ms.

Example 12

| | | |
|---|---|---|
| 3-H1OB(2F,3F)-O2 | (3-3-1) | 8% |
| 3-HHB(2F,3F)-O2 | (3-6-1) | 8% |
| 3-HH1OB(2F,3F)-O2 | (3-8-1) | 24% |
| 2-HBB(2F,3F)-O2 | (3-13-1) | 3% |
| 3-HBB(2F,3F)-O2 | (3-13-1) | 8% |
| 2-HH-3 | (4-1-1) | 26% |
| 3-HH-4 | (4-1-1) | 4% |
| 3-HH-5 | (4-1-1) | 3% |
| 1-BB-3 | (4-3-1) | 16% |

0.015 Part by weight of compound (1-6-1) that was the first component of the invention, 0.28 part by weight of compound (2-1-1) that was the second component of the invention, and 0.005 part by weight of compound (2-2-1) that was the second component of the invention were added to 100 parts by weight of the preceding composition.

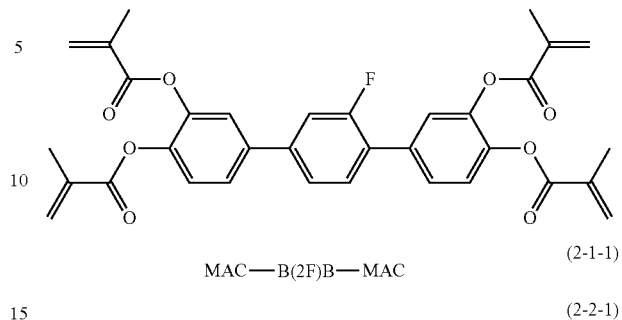

MAC—B(2F)B—MAC  (2-1-1)

AC—VO—BB—OV—AC  (2-2-1)

The characteristics of the resulting composition were as follows: NI=74.2° C.; Tc<−20° C.; Δn=0.097; Δ∈=−3.1; Vth=2.24 V; VHR-1=99.1%; VHR-2=98.0%. The response time (τ) of the liquid crystal display device prepared by the method described in Example 1 was 3.9.

Example 13

| | | |
|---|---|---|
| 3-H1OB(2F,3F)-O2 | (3-3-1) | 11% |
| 3-HHB(2F,3F)-O2 | (3-6-1) | 10% |
| V-HHB(2F,3F)-O1 | (3-6-1) | 5% |
| V-HHB(2F,3F)-O2 | (3-6-1) | 13% |
| 3-HH1OB(2F,3F)-O2 | (3-8-1) | 3% |
| 2-HBB(2F,3F)-O2 | (3-13-1) | 4% |
| 3-HBB(2F,3F)-O2 | (3-13-1) | 6% |
| 2-HH-3 | (4-1-1) | 25% |
| 3-HH-4 | (4-1-1) | 6% |
| 1-BB-3 | (4-3-1) | 13% |
| 3-HHB-1 | (4-5-1) | 4% |

0.02 Part by weight of compound (1-6-1) that was the first component of the invention, 0.27 part by weight of compound (2-1-1) that was the second component of the invention, and 0.01 part by weight of compound (2-2-1) that was the second component of the invention were added to 100 parts by weight of the preceding composition.

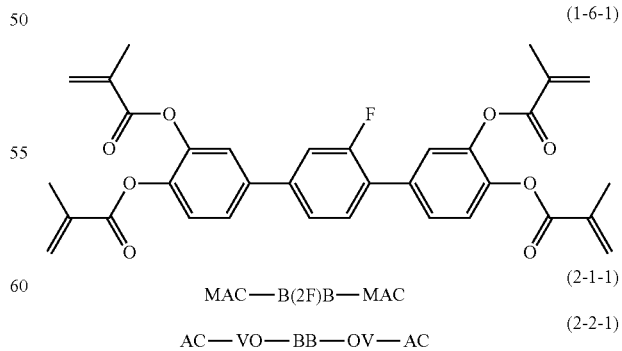

MAC—B(2F)B—MAC  (2-1-1)

AC—VO—BB—OV—AC  (2-2-1)

The characteristics of the resulting composition were as follows: NI=75.5° C.; Tc<−20° C.; Δn=0.095; Δ∈=−2.9; Vth=2.26 V; VHR-1=98.9%; VHR-2=97.7%. The response time (τ) of the liquid crystal display device prepared by the method described in Example 1 was 4.1 ms.

Example 14

| 3-H2B(2F,3F)-O2 | (3-2-1) | 19% |
| 5-H2B(2F,3F)-O2 | (3-2-1) | 10% |
| 3-HHB(2F,3F)-O2 | (3-6-1) | 5% |
| 5-HHB(2F,3F)-O2 | (3-6-1) | 4% |
| 3-HDhB(2F,3F)-O2 | (3-11-1) | 5% |
| 3-HBB(2F,3F)-O2 | (3-13-1) | 10% |
| 4-HBB(2F,3F)-O2 | (3-13-1) | 8% |
| 5-HBB(2F,3F)-O2 | (3-13-1) | 4% |
| 2-HH-3 | (4-1-1) | 23% |
| 3-HH-4 | (4-1-1) | 6% |
| 3-HHB-O1 | (4-5-1) | 3% |
| 3-HHB-3 | (4-5-1) | 3% |

0.007 Part by weight of compound (1-6-1) that was the first component of the invention, 0.28 part by weight of compound (2-1-1) that was the second component of the invention, and 0.003 part by weight of compound (2-2-1) that was the second component of the invention were added to 100 parts by weight of the preceding composition.

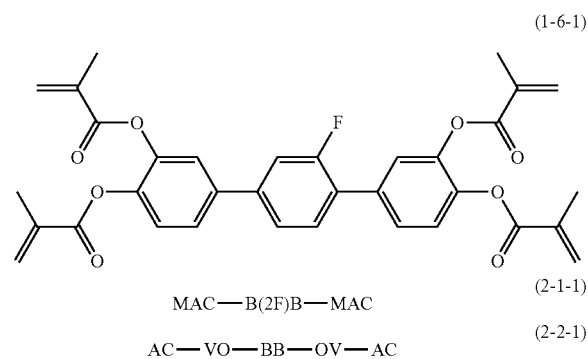

MAC—B(2F)B—MAC (1-6-1)

AC—VO—BB—OV—AC (2-1-1)
(2-2-1)

The characteristics of the resulting composition were as follows: NI=77.4° C.; Tc<−20° C.; Δn=0.090; Δ∈=−3.6; Vth=2.12 V; VHR-1=99.3%; VHR-2=98.2%. The response time (τ) of the liquid crystal display device prepared by the method described in Example 1 was 5.0 ms.

Example 15

| 3-H1OB(2F,3F)-O2 | (3-3-1) | 3% |
| 3-BB(2F,3F)-O2 | (3-4-1) | 9% |
| 2O-BB(2F,3F)-O2 | (3-4) | 3% |
| 2-HH1OB(2F,3F)-O2 | (3-8-1) | 7% |
| 3-HH1OB(2F,3F)-O2 | (3-8-1) | 22% |
| 2-HH-3 | (4-1-1) | 14% |
| 3-HH-V | (4-1-1) | 15% |
| 1-BB-3 | (4-3-1) | 11% |
| 3-HHB-1 | (4-5-1) | 3% |
| 3-HHB-3 | (4-5-1) | 4% |
| 3-HBB-2 | (4-6-1) | 9% |

0.15 Part by weight of compound (1-6-1) that was the first component of the invention and 0.05 part by weight of compound (2-2-1) that was the second component of the invention were added to 100 parts by weight of the preceding composition.

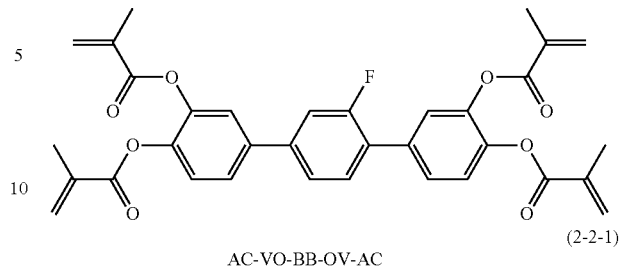

AC-VO-BB-OV-AC (1-6-1)
(2-2-1)

The characteristics of the resulting composition were as follows: NI=74.6° C.; Tc<−20° C.; Δn=0.103; Δ∈=−2.7; Vth=2.38 V; VHR-1=99.1%; VHR-2=98.0%. The response time (τ) of the liquid crystal display device prepared by the method described in Example 1 was 4.2 ms.

The compositions in Example 1 to Example 15 have a short response time in comparison with the composition in Comparative example 1. Therefore, it can be concluded that the liquid crystal composition of the invention has more excellent characteristics than that shown in Comparative example 1.

INDUSTRIAL APPLICABILITY

The composition of the invention satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat, or is suitably balanced between at least two of the characteristics. A liquid crystal display device containing such a composition can be used for a liquid crystal projector, a liquid crystal television and so forth, since it has a short response time, a large voltage holding ratio, a large contrast ratio, a long service life and so forth.

What is claimed is:
1. A liquid crystal composition having a nematic phase and including at least one compound selected from the group of compounds represented by formula (1) as a first component and at least one compound selected from the group of compounds represented by formula (2) as a second component:

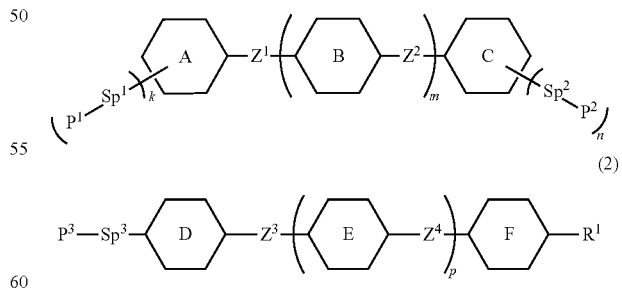

(1)

(2)

wherein $R^1$ is hydrogen, alkyl having 1 to 12 carbons, alkoxy having 1 to 12 carbons, alkenyl having 2 to 12 carbons, alkenyl having 2 to 12 carbons in which at least one hydrogen has been replaced by fluorine, or -Sp$^4$-P$^4$; $P^1$, $P^2$, $P^3$ and $P^4$ are independently a group selected from groups represented by formulae (P-1), (P-2) and (P-3);

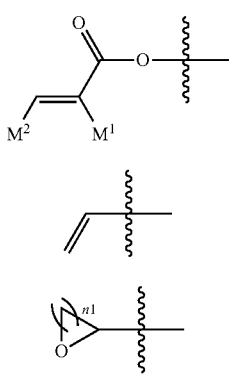
(P-1)

(P-2)

(P-3)

in formula (P-1), $M^1$ and $M^2$ are independently hydrogen, fluorine, methyl or —$CF_3$; in formula (P-3), $n^1$ is 1, 2, 3 or 4;

$Sp^1$, $Sp^2$, $Sp^3$ and $Sp^4$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH=CH— or —C≡C—; $Z^1$, $Z^2$ and $Z^4$ are independently a single bond, ethylene, methyleneoxy or carbonyloxy; $Z^3$ is a single bond, ethylene, methyleneoxy, —CO—$CR^2$=$CR^3$—, —$CR^2$=$CR^3$—CO—, —$CR^2$=$CR^3$—, —C(=$CR^2R^3$)— or —C(=$R^4$)—; $R^2$ and $R^3$ are independently hydrogen, halogen, alkyl having 1 to 10 carbons, or alkyl having 1 to 10 carbons in which at least one hydrogen has been replaced by fluorine; $R^4$ is a group selected from groups represented by formula (R-1);

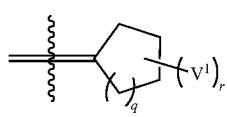
(R-1)

in formula (R-1), each $V^1$ is independently halogen, alkyl having 1 to 6 carbons or alkyl having 1 to 6 carbons in which at least one hydrogen has been replaced by fluorine; q is an integer from 1 to 8; r is an integer from 0 to 4;

ring A is 1-cyclohexyl in which hydrogen may be replaced by $P^1$-$Sp^1$-, 1-phenyl in which hydrogen may be replaced by $P^1$-$Sp^1$-, or 2-naphthyl in which hydrogen may be replaced by $P^1$-$Sp^1$-; ring C is 1-cyclohexyl in which hydrogen may be replaced by -$Sp^2$-$P^2$, 1-phenyl in which hydrogen may be replaced by -$Sp^2$-$P^2$, or 2-naphthyl in which hydrogen may be replaced by -$Sp^2$-$P^2$; ring D and ring F are independently 1,4-cyclohexylene, 1,4-phenylene, naphthalene-2,6-diyl, 2-fluoro-1,4-phenylene, 3-fluoro-1,4-phenylene, 2,3-difluoro-1,4-phenylene, 2-methyl-1,4-phenylene, 3-methyl-1,4-phenylene, 2-trifluoromethyl-1,4-phenylene or 3-trifluoromethyl-1,4-phenylene; ring B and ring E are independently 1,4-cyclohexylene, 1,4-phenylene, naphthalene-2,6-diyl, 2-fluoro-1,4-phenylene, 3-fluoro-1,4-phenylene, 2,3-difluoro-1,4-phenylene, 3,6-difluoro-1,4-phenylene, 2-methyl-1,4-phenylene, 3-methyl-1,4-phenylene, 2-trifluoromethyl-1,4-phenylene or 3-trifluoromethyl-1,4-phenylene; m is 0, 1 or 2; k is 0, 1, 2 or 3, n is 0, 1, 2 or 3, and the sum of k and n is 3 or 4; p is 0, 1 or 2; and at least one of $Sp^1$ and $Sp^2$ has —O— when both $P^1$ and $P^2$ are a group represented by formula (P-2) and $Sp^3$ has —O— when $P^3$ is a group represented by formula (P-2).

2. The liquid crystal composition according to claim 1, including at least one compound selected from the group of compounds represented by formula (1-1) as the first component:

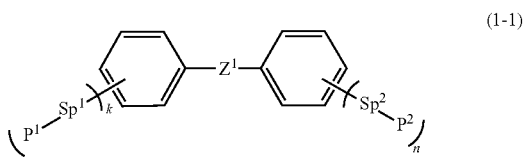
(1-1)

wherein $P^1$ and $P^2$ are independently a group selected from groups represented by formula (P-1), formula (P-2) and formula (P-3);

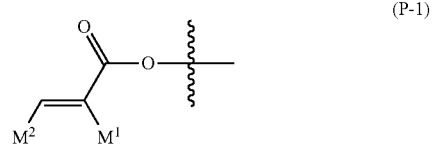
(P-1)

(P-2)

(P-3)

in formula (P-1), $M^1$ and $M^2$ are independently hydrogen, fluorine, methyl or —$CF_3$; in formula (P-3), $n^1$ is 1, 2, 3 or 4;

$Sp^1$ and $Sp^2$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH=CH— or —C≡C—; $Z^1$ is a single bond, ethylene, methyleneoxy or carbonyloxy; k is 0, 1, 2 or 3, n is 0, 1, 2 or 3, and the sum of k and n is 3 or 4; and at least one of $Sp^1$ and $Sp^2$ has —O— when both $P^1$ and $P^2$ are a group represented by formula (P-2).

3. The liquid crystal composition according to claim 1, including at least one compound selected from the group of compounds represented by formula (1-6) as the first component:

(1-6)

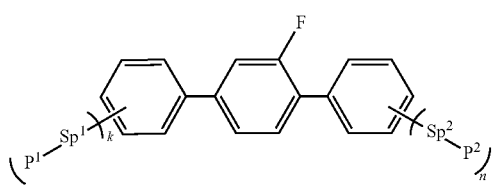

wherein $R^2$ and $R^3$ are independently hydrogen, halogen, alkyl having 1 to 10 carbons or alkyl having 1 to 10 carbons in which at least one hydrogen has been replaced by fluorine; $P^1$ and $P^2$ are independently a group selected from groups represented by formula (P-1), formula (P-2) and formula (P-3);

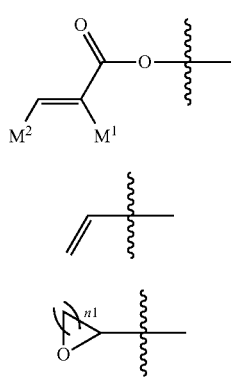

in formula (P-1), $M^1$ and $M^2$ are independently hydrogen, fluorine, methyl or —$CF_3$; in formula (P-3), $n^1$ is 1, 2, 3 or 4;

$Sp^1$ and $Sp^2$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH=CH— or —C≡C—; k is 0, 1, 2 or 3, n is 0, 1, 2 or 3, and the sum of k and n is 3 or 4; and at least one of $Sp^1$ and $Sp^2$ has —O— when both $P^1$ and $P^2$ are a group represented by formula (P-2).

4. The liquid crystal composition according to claim 1, including at least one compound selected from the group of compounds represented by formula (2-1) to formula (2-22) as the second component:

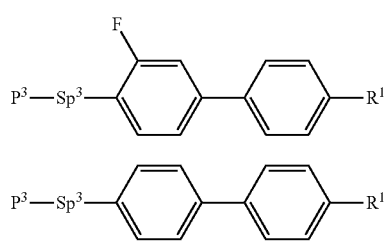

(2-3)
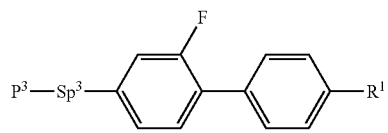

(2-4)
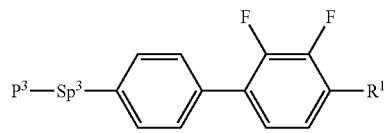

(2-5)
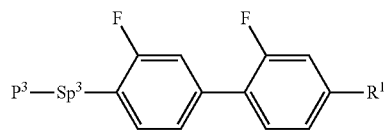

(2-6)
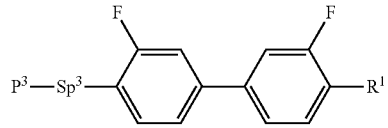

(2-7)
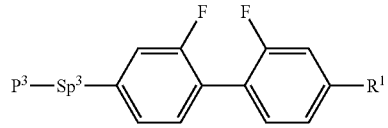

(2-8)
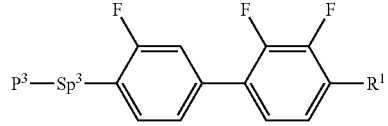

(2-9)
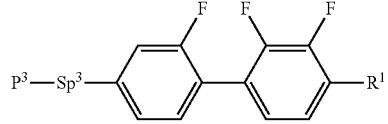

(2-10)
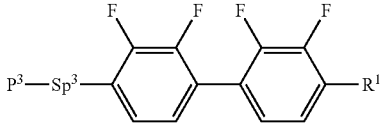

(2-11)
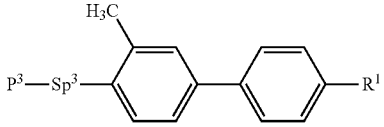

(2-12)
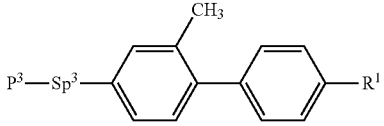

(2-13)
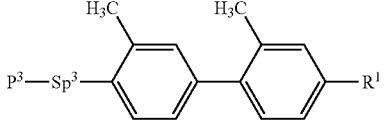

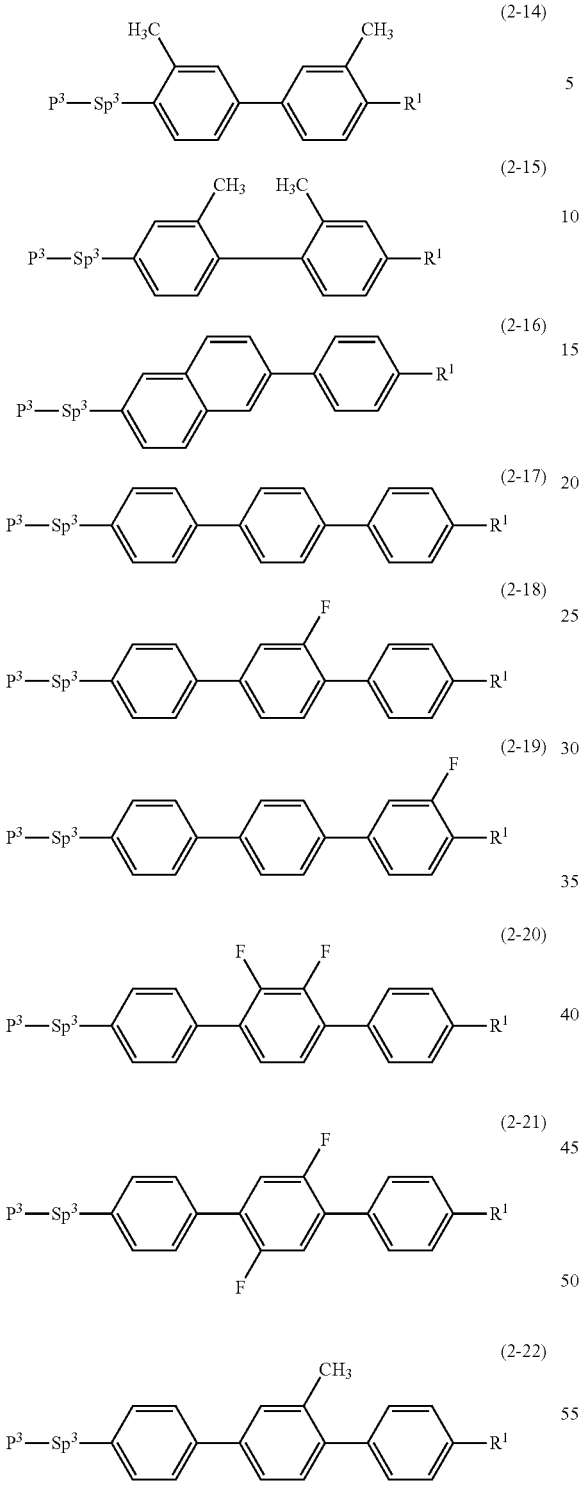

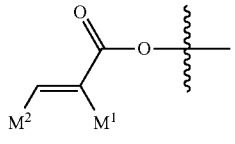

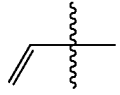

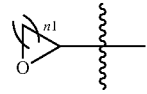

in formula (P-1), $M^1$ and $M^2$ are independently hydrogen, fluorine, methyl or —$CF_3$; in formula (P-3), $n^1$ is 1, 2, 3 or 4;

$Sp^3$ and $Sp^4$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH═CH— or —C≡C—; and $Sp^3$ has —O— when $P^3$ is a group represented by formula (P-2).

5. The liquid crystal composition according to claim 1, wherein the ratio of the first and second components in total is in the range of 0.03 part by weight to 10 parts by weight based on the liquid crystal composition, excluding the first and second components.

6. The liquid crystal composition according to claim 1, further including at least one compound selected from the group of compounds represented by formula (3) as a third component:

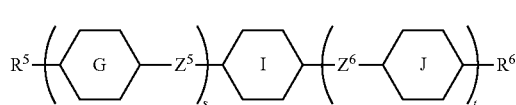

(3)

wherein $R^5$ and $R^6$ are independently alkyl having 1 to 12 carbons, alkoxy having 1 to 12 carbons, alkenyl having 2 to 12 carbons or alkenyloxy having 2 to 12 carbons; ring G and ring J are independently 1,4-cyclohexylene, tetrahydropyran-2,5-diyl, 1,4-phenylene, or 1,4-phenylene in which at least one hydrogen has been replaced by fluorine or chlorine; ring I is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^5$ and $Z^6$ are independently a single bond, ethylene, methyleneoxy or carbonyloxy; and s is 1, 2 or 3, t is 0 or 1 and the sum of s and t is 3 or less.

7. The liquid crystal composition according to claim 1, including at least one compound selected from the group of compounds represented by formula (3-1) to formula (3-19) as the third component:

wherein $R^1$ is hydrogen, alkyl having 1 to 12 carbons, alkoxy having 1 to 12 carbons, alkenyl having 2 to 12 carbons, alkenyl having 2 to 12 carbons in which at least one hydrogen has been replaced by fluorine, or -$Sp^4$-$P^4$; $P^3$ and $P^4$ are independently a group selected from groups represented by formula (P-1), formula (P-2) and formula (P-3);

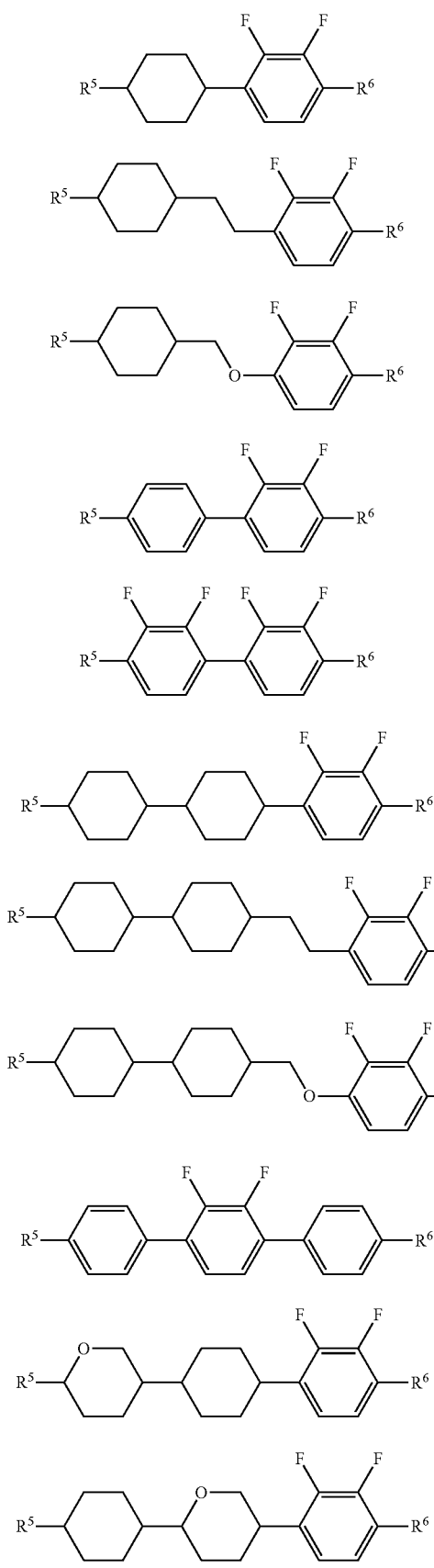
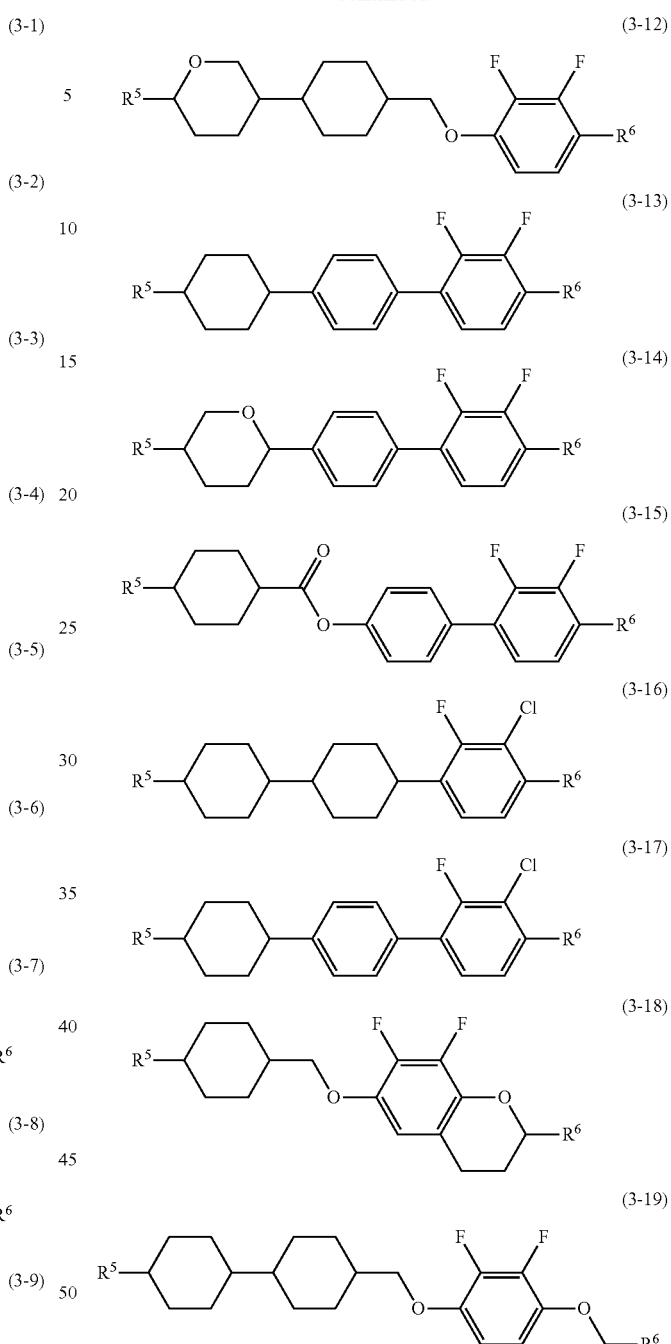

wherein $R^5$ and $R^6$ are independently alkyl having 1 to 12 carbons, alkoxy having 1 to 12 carbons, alkenyl having 2 to 12 carbons or alkenyloxy having 2 to 12 carbons.

8. The liquid crystal composition according to claim 6, wherein the ratio of the third component is in the range of 10% by weight to 90% by weight based on the liquid crystal composition, excluding the first and second components.

9. The liquid crystal composition according to claim 1, further including at least one compound selected from the group of compounds represented formula (4) as a fourth component:

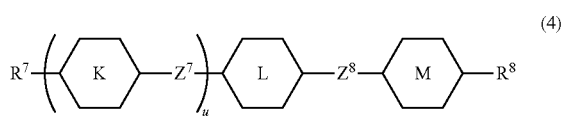
(4)

wherein R⁷ and R⁸ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine; ring K, ring L and ring M are independently 1,4-cyclohexylene, 1,4-phenylene, 2-fluoro-1,4-phenylene or 3-fluoro-1,4-phenylene; $Z^7$ and $Z^8$ are independently a single bond, ethylene, methyleneoxy or carbonyloxy; and u is 0, 1 or 2.

10. The liquid crystal composition according to claim 6, further including at least one compound selected from the group of compounds represented formula (4) as a fourth component:

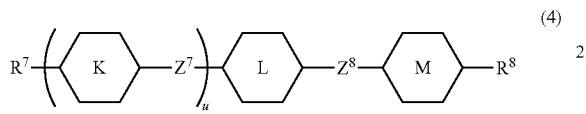
(4)

wherein R⁷ and R⁸ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine; ring K, ring L and ring M are independently 1,4-cyclohexylene, 1,4-phenylene, 2-fluoro-1,4-phenylene or 3-fluoro-1,4-phenylene; $Z^7$ and $Z^8$ are independently a single bond, ethylene, methyleneoxy or carbonyloxy; and u is 0, 1 or 2.

11. The liquid crystal composition according to claim 1, including at least one compound selected from the group of compounds represented by formula (4-1) to formula (4-13) as the fourth component:

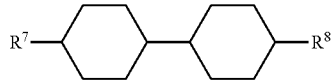
(4-1)

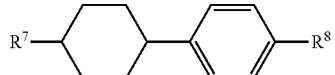
(4-2)

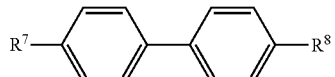
(4-3)

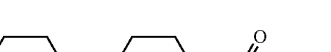
(4-4)

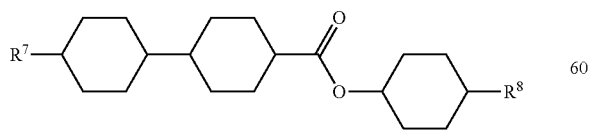
(4-5)

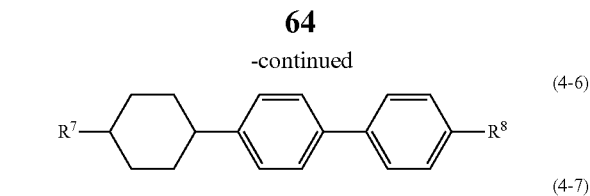
(4-6)

(4-7)

(4-8)

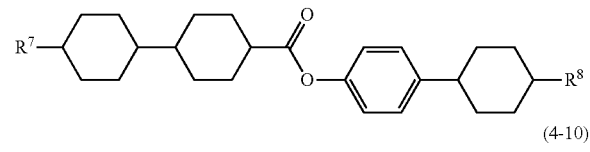
(4-9)

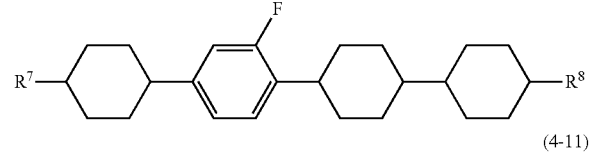
(4-10)

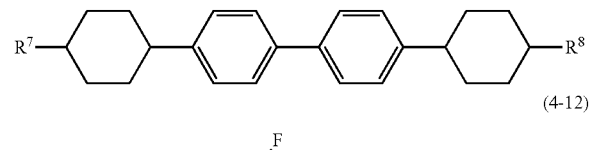
(4-11)

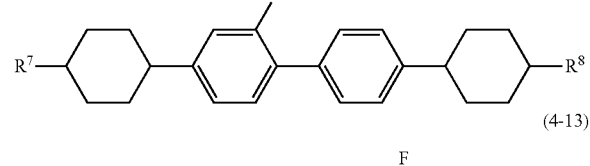
(4-12)

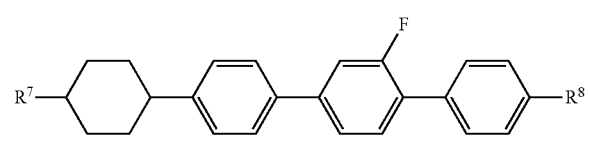
(4-13)

wherein R⁷ and R⁸ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine.

12. The liquid crystal composition according to claim 6, including at least one compound selected from the group of compounds represented by formula (4-1) to formula (4-13) as the fourth component:

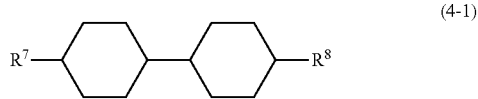
(4-1)

(4-2)

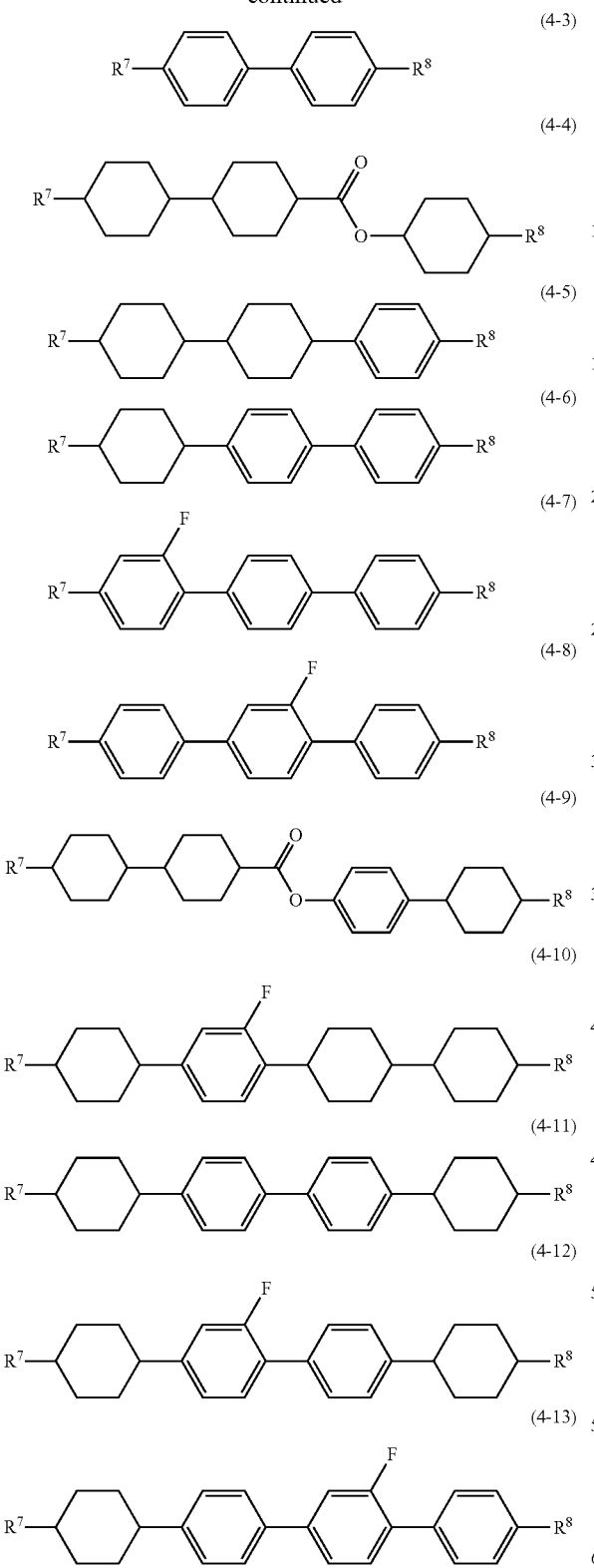

wherein $R^7$ and $R^8$ are independently alkyl having 1 to 12 carbons, alkoxy having 1 to 12 carbons, alkenyl having 2 to 12 carbons or alkenyl having 2 to 12 carbons in which at least one hydrogen has been replaced by fluorine.

13. The liquid crystal composition according to claim 9, wherein the ratio of the fourth component is in the range of 10% by weight to 90% by weight based on the liquid crystal composition, excluding the first and second components.

14. The liquid crystal composition according to claim 10, wherein the ratio of the fourth component is in the range of 10% by weight to 90% by weight based on the liquid crystal composition, excluding the first and second components.

15. The liquid crystal composition according to claim 1, wherein the weight ratio of the first component to the second component is in the range of 9:1 to 2:8.

16. The liquid crystal composition according to claim 1, further including a polymerization initiator.

17. The liquid crystal composition according to claim 1, further including a polymerization inhibitor.

18. The liquid crystal composition according to claim 1, wherein the maximum temperature of a nematic phase is 70° C. or higher, the optical anisotropy (measured at 25° C.) at a wavelength of 589 nanometers is 0.08 or more, and the dielectric anisotropy (measured at 25° C.) at a frequency of 1 kHz is −2 or less.

19. A polymer sustained alignment type (PSA) liquid crystal display device, wherein the device is composed of two substrates where at least one of the substrates has an electrode layer, a liquid crystal composition according to claim 1 is arranged between these two substrates, and a compound having a polymerizable group included in the liquid crystal composition is polymerized.

20. The liquid crystal display device according to claim 19, wherein an operating mode of the liquid crystal display device is a VA mode, an IPS mode, an FFS mode or an FPA mode, and a driving mode of the liquid crystal display device is an active matrix mode.

21. Method for producing a liquid crystal display device, wherein the liquid crystal display device is produced by arranging a liquid crystal composition according to claim 1, between two substrates, by irradiating with light under the conditions of an applied voltage, and by polymerizing a compound having a polymerizable group.

22. A liquid crystal composition, having a nematic phase, and including at least one compound selected from the group of compounds represented by formulae (1-2) to (1-5) as a first component and at least one compound selected from the group of compounds having one polymerizable group and compounds having two polymerizable groups as a second component:

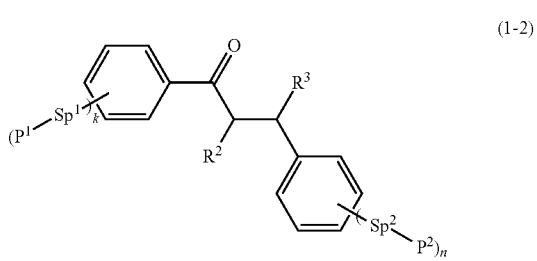

(1-2)

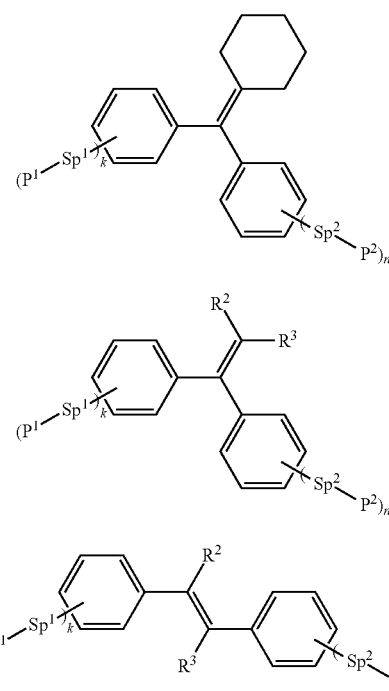

(1-3)

(1-4)

(1-5)

wherein
in formulae (1-2) to (1-4), $R^2$ and $R^3$ are independently hydrogen, halogen, alkyl having 1 to 10 carbons, or alkyl having 1 to 10 carbons in which at least one hydrogen has been replaced by fluorine;

in formula (1-5), $R^2$ and $R^3$ are independently alkyl having 1 to 10 carbons, or alkyl having 1 to 10 carbons in which at least one hydrogen has been replaced by fluorine;

$P^1$ and $P^2$ are independently a group selected from groups represented by formulae (P-1), (P-2) and (P-3);

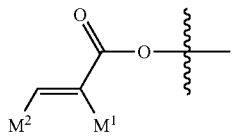

(P-1)

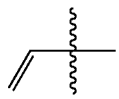

(P-2)

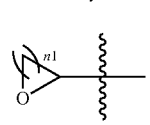

(P-3)

wherein in formula (P-1), $M^1$ and $M^2$ are independently hydrogen, fluorine, methyl or —$CF_3$, and in formula (P-3), $n^1$ is 1, 2, 3 or 4;

$Sp^1$ and $Sp^2$ are independently a single bond or alkylene having 1 to 12 carbons, and in the alkylene, at least one hydrogen may be replaced by halogen or —C≡N, at least one —$CH_2$— may be replaced by —O—, —S—, —NH—, —CO—, —CO—O—, —O—CO— or —O—CO—O—, and at least one —$CH_2$—$CH_2$— may be replaced by —CH=CH— or —C≡C—; k is 0, 1, 2 or 3, n is 0, 1, 2 or 3, and the sum of k and n is 3 or 4; at least one of $Sp^1$ and $Sp^2$ has —O— when both $P^1$ and $P^2$ are a group represented by formula (P-2).

* * * * *